(12) United States Patent  
Tang et al.

(10) Patent No.: US 8,295,367 B2
(45) Date of Patent: Oct. 23, 2012

(54) METHOD AND APPARATUS FOR VIDEO SIGNAL PROCESSING

(75) Inventors: Monica Tang, Santa Clara, CA (US); Joseph Cesana, Palo Alto, CA (US); Aleksandr Movshovich, Santa Clara, CA (US)

(73) Assignee: CSR Technology Inc., Sunnyvale, CA (US)

( * ) Notice: Subject to any disclaimer, the term of this patent is extended or adjusted under 35 U.S.C. 154(b) by 899 days.

(21) Appl. No.: 12/351,237

(22) Filed: Jan. 9, 2009

(65) Prior Publication Data

US 2009/0180026 A1    Jul. 16, 2009

Related U.S. Application Data

(60) Provisional application No. 61/020,662, filed on Jan. 11, 2008.

(51) Int. Cl.
*H04N 7/12* (2006.01)

(52) U.S. Cl. .................................. 375/240.29

(58) Field of Classification Search ............. 375/240.01, 375/240.26, 240.27, 240.28, 240.29
See application file for complete search history.

(56) References Cited

U.S. PATENT DOCUMENTS

| | | | |
|---|---|---|---|
| 5,512,956 A | 4/1996 | Yan | |
| 5,819,035 A | 10/1998 | Devaney et al. | |
| 6,011,868 A | 1/2000 | van den Branden et al. | |
| 6,466,624 B1 | 10/2002 | Fogg | |
| 6,748,113 B1 | 6/2004 | Kondo et al. | |
| 6,845,180 B2 | 1/2005 | Matthews | |
| 7,003,173 B2 | 2/2006 | Deshpande | |
| 7,003,174 B2 | 2/2006 | Kryukov et al. | |
| 2005/0168644 A1 | 8/2005 | Demas et al. | |
| 2006/0110065 A1 | 5/2006 | Huang et al. | |
| 2006/0171466 A1 | 8/2006 | Schoner et al. | |
| 2006/0171467 A1 | 8/2006 | Schoner et al. | |
| 2006/0171473 A1 | 8/2006 | Schoner | |
| 2006/0268980 A1* | 11/2006 | Le Dinh et al. | 375/240.01 |
| 2006/0274959 A1* | 12/2006 | Piastowski | 382/268 |
| 2007/0081596 A1 | 4/2007 | Lin et al. | |
| 2009/0148062 A1* | 6/2009 | Gabso et al. | 382/266 |

* cited by examiner

*Primary Examiner* — Gilberto Barron, Jr.
*Assistant Examiner* — Malcolm Cribbs
(74) *Attorney, Agent, or Firm* — Lando & Anastasi, LLP

(57) ABSTRACT

Systems and methods of processing a video signal are provided. A potential block boundary can be detected between a first block and a second block of a frame of the video signal, wherein the frame, the first block, and the second block each include a plurality of pixels. An offset parameter can be determined for at least one pixel of at least one of the first block and the second block. Based on the offset parameter, a boundary verification value of at least one of the first block and the second block can also be determined. Based on the boundary verification value, it can further be determined if the potential block boundary includes a block boundary.

29 Claims, 9 Drawing Sheets

Video Signal with Filtered Block Boundary

METHOD AND APPARATUS FOR VIDEO SIGNAL PROCESSING

CROSS REFERENCE TO RELATED APPLICATIONS

This application claims priority under 35 U.S.C. 119(e) to U.S. Provisional Application Ser. No. 61/020,662 entitled "Method and Apparatus for MPEG Blocking Artifact Removal," filed Jan. 11, 2008, which is incorporated herein by reference in its entirety.

BACKGROUND OF THE INVENTION

1. Field of Invention

Aspects of the present invention are directed to processing of a video signal, and more particularly to a system and method for minimizing distortion in a video signal.

2. Discussion of Related Art

Digital video signals contain compressed data in order to conserve system resources such as bandwidth and memory. To do so, the images that constitute the video signal can be divided into a series of quadrilateral segments, referred to as blocks, where each block contains at least one pixel, ordered by row and column. The data in each of these blocks can be transformed into a matrix of coefficients. These coefficients are then quantized into discrete values, and each quantized coefficient matrix is compressed to further reduce the matrix to a smaller array of discrete numbers. A Fourier related transform such as a discrete cosine transform (DCT) is an example of a transform that can be applied to each block to facilitate this data compression. Video compression standards associated with this type of compression include MPEG, JPEG, H.261, H.263, H.264, etc.

Some forms of compression can be lossy, and as such, a certain amount of data can be permanently lost during the compression process. Due to this data loss, a reconstructed image based on the compressed signal may not be identical to the image as it existed prior to its compression and encoding. Instead, the reconstructed image is an estimation of what the original image looked like. Various compression schemes seek to minimize the impact of the lost data by canceling redundant spatial or temporal data, nearly redundant data, or data that is deemed to be of less importance. Despite these efforts, compression of a video signal can still result in various unwanted compression artifacts and other humanly perceptible data errors.

SUMMARY OF THE INVENTION

Aspects and embodiments are directed to systems and methods of processing a video signal. Potential block boundaries can be detected and a confidence level that the potential block boundaries are indeed block boundaries can be determined. A filter can be provided to selectively filter block boundaries and other artifacts while maintaining portions of the video signal that may not include these artifacts in a non-filtered form. This improves the quality of video signals.

At least one aspect is directed to a method of processing a video signal. The method detects a potential block boundary between a first block and a second block of a frame of the video signal, wherein the frame, the first block, and the second block each include a plurality of pixels. An offset parameter can be determined for at least one pixel of at least one of the first block and the second block. Based on the offset parameter, a boundary verification value of at least one of the first block and the second block can also be determined. Based on the boundary verification value, it can further be determined if the potential block boundary includes a block boundary artifact.

At least one other aspect is directed to a system for processing a video signal. The system includes a block boundary detector to detect a potential block boundary between a first block and a second block of a frame of the video signal, wherein the frame, the first block, and the second block each include a plurality of pixels. The system can also include a controller. The controller can determine an offset parameter for at least one pixel of at least one of the first block and the second block. The controller can also determine, based on the offset parameter, a boundary verification value of at least one of the first and second blocks. Further, the controller can determine, based on the boundary verification value, if the potential block boundary includes a block boundary artifact.

At least one other aspect is directed to a computer readable medium having stored thereon sequences of instructions. The instructions include instructions that can cause a processor to detect a potential block boundary between a first block and a second block of a frame of the video signal, wherein the frame, the first block, and the second block each include a plurality of pixels. The instructions can also cause the processor to determine an offset parameter for at least one pixel of at least one of the first block and the second block, and to determine, based on the offset parameter, a boundary verification value of at least one of the first block and the second block. Further, the instructions include instructions that can cause a processor to determine, based on the boundary verification value, if the potential block boundary includes a block boundary artifact.

In various embodiments it may be determined if the potential block boundary includes a block boundary artifact based on a comparison of the boundary verification value with a boundary threshold value; and a pixel that forms part of the block boundary artifact may be identified from the plurality of pixels and the offset parameter. At least one component of the pixel may also be filtered. The boundary verification value may be compared to a boundary threshold value to determine that the potential block boundary is not the block boundary artifact, a pixel that forms part of the potential block boundary may be identified, and a component of the pixel may be maintained in an unfiltered form. The frame of the video signal may include a plurality of rows and a plurality of columns, with each row and each column including at least one pixel.

In some embodiments, an edge value of each pixel of four consecutive pixels of one of the plurality of rows and the plurality of columns may be determined, wherein the first and second pixels are included in the first block, wherein the third and fourth pixels are included in the second block, and wherein the second and third pixels form part of the potential block boundary. In one embodiment, at least one of a luminance component and a chrominance component of at least one of the pixels may be filtered from the frame. A plurality of potential block boundaries of the frame may be detected, and an indicator of a number of potential block boundaries of the frame may be stored. In one embodiment, a 2-dimensional gradient measurement may be performed on a luminance component of at least one of the plurality of pixels, and the results of the 2-dimensional gradient measurement may be accumulated and stored in at least one register. In various embodiments, the boundary verification value may be adjusted based at least in part on a second boundary verification value of a block of a second frame of the video signal.

Other aspects, embodiments, and advantages of these exemplary aspects and embodiments will become apparent from the following detailed description, taken in conjunction with the accompanying drawings, illustrating the principles of the invention by way of example only. It is to be understood that the foregoing information and the following detailed description include illustrative examples of various aspects and embodiments, and are intended to provide an overview or framework for understanding the nature and character of the claimed aspects and embodiments. The drawings, together with the remainder of the specification, serve to explain principles and operations of the described and claimed aspects and embodiments.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. The foregoing and other objects, features, and advantages of the systems and methods disclosed herein, will be more fully understood from the following description of various embodiments, when read together with the accompanying drawings, in which.

DETAILED DESCRIPTION

Figure 1:
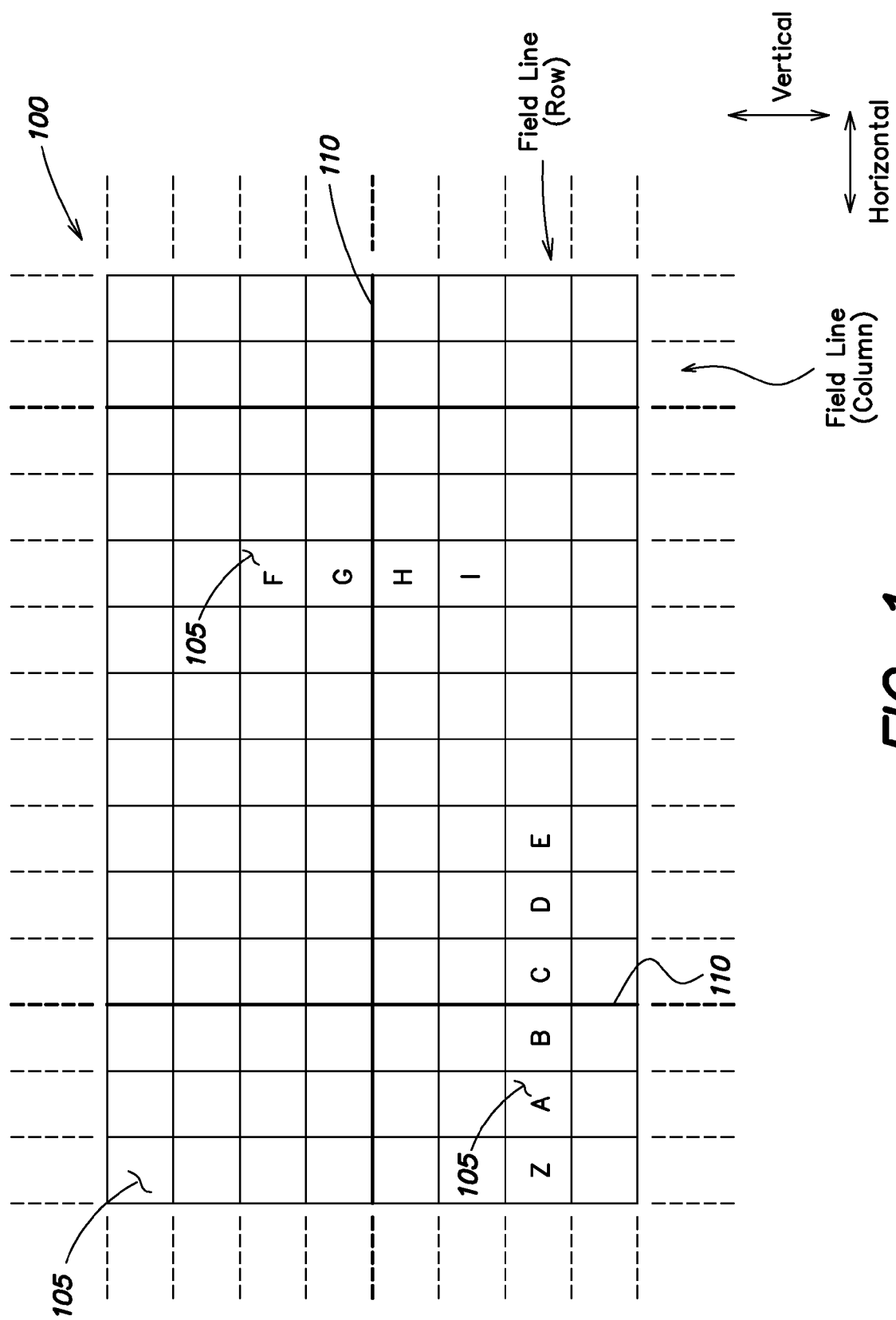
FIG. 1 is a diagram depicting a video signal in accordance with an embodiment of the present invention.

The systems and methods described herein are not limited in their application to the details of construction and the arrangement of components set forth in the description or illustrated in the drawings. The invention is capable of other embodiments and of being practiced or of being carried out in various ways. Also, the phraseology and terminology used herein is for the purpose of description and should not be regarded as limiting. The use of "including" "comprising" "having" "containing" "involving" and variations thereof herein, is meant to encompass the items listed thereafter and equivalents thereof as well as additional items.

Various aspects and embodiments are directed to video signal processing. As discussed further below, frames of video signals can include a plurality of blocks. Lossy compression of data in the video signals can introduce visible artifacts, such as blocking artifacts, which appear as visually perceptible outlines between neighboring blocks in the displayed image reconstructed from the video signal. To distinguish block boundaries and other distortions from areas of contrast that form part of the image, a plurality of potential block boundaries may be detected in at least one frame of the video signal. A boundary verification value can indicate a confidence level to determine if the potential block boundary is indeed a block boundary. Block boundaries, having been identified with confidence and distinguished from other areas of contrast in a video signal, may then be filtered from the video signal, improving its resulting display. Further, by indicating with confidence that a potential block boundary is an intended part of the image, and not a block boundary, unnecessary filtering of the video signal can be avoided, further improving the resulting display.

FIG. 1 is a diagram depicting a video signal 100 in accordance with an embodiment of the invention. In one embodiment, video signal 100 includes a video signal that conforms to a MPEG (Moving Picture Experts Group) video compression standard. For example, video signal 100 may include a bitstream conforming to MPEG compression, transport, encoding, or decoding standards. Video signal 100 can be a digital signal, and in various embodiments, video signal 100 may include either an interlaced video signal or a progressive video signal.

In one embodiment, video signal 100 includes a sequence of a plurality of frames of a video signal. Examples of these frames include intra-coded frames, predictive coded frames, and bidirectional predictive coded frames. The frames can be divided into a series of quadrilateral segments, referred to as macroblocks (or simply as blocks), where each macroblock may contain at least one pixel, ordered by row and column. In one embodiment, each macroblock includes an eight pixel by eight pixel block of 64 pixels, although video signal 100 may include other pixel configurations and macroblock sizes. In some embodiments, frames of video signal 100 include a plurality of field lines that may be grouped into fields of alternating parity.

In one embodiment, the frames of video signal 100 can include a plurality of pixels 105. For example, pixels 105 can be oriented in a row so that each field line includes a row of pixels 105. In one embodiment, a frame of video signal 100 may include a row of pixels 105 along the length of a one pixel wide field line. The number of pixels along the length and width of field lines can vary, as can the number of pixels in a frame. For the purpose of illustration, not every pixel 105 is labeled with identifier 105 in every field line in FIG. 1.

As depicted in FIG. 1, some of pixels 105 may cross a block boundary 110, which is indicated by the bold boundary in FIG. 1. Block boundaries 110 may include, for example, the visible outlines of macroblocks of a compressed image that are not part of the original image. As such, block boundaries 110 may result in abrupt and unnatural looking changes in the color, contrast, intensity, shape or form of a displayed compressed image. These visible artifacts degrade the quality of an image and can be objectionable to a viewer. For example, when a frame of video signal 100 includes 8×8 pixel macroblock configurations, a block boundary may occur after every $8^{th}$ pixel in the frame, i.e., a block boundary occurs between at least a portion of two adjacent macroblocks. As depicted in FIG. 1, a block boundary 110 exists between pixels 105 labeled "B" and "C" and another block boundary 110 exists between pixels 105 labeled "G" and "H." In this illustrative embodiment, pixels 105 labeled "Z", "A" and "B" are in a different macroblock than the macroblock associated with pixels 105 labeled "C", "D" and "E". Pixels 105 labeled "F" and "G" are also in a different macroblock than the macroblock that includes pixels 105 labeled "H" and "I." In one embodiment, block boundaries 110 include discrete cosine transform (DCT) or other Fourier related transform boundaries, and these boundaries may occur in either a horizontal or vertical direction. It should be appreciated that, as illustrated in the example of FIG. 1, pixels 105 labeled "C" "D" "E" "H" and "I" are included in the same macroblock.

Figure 2:
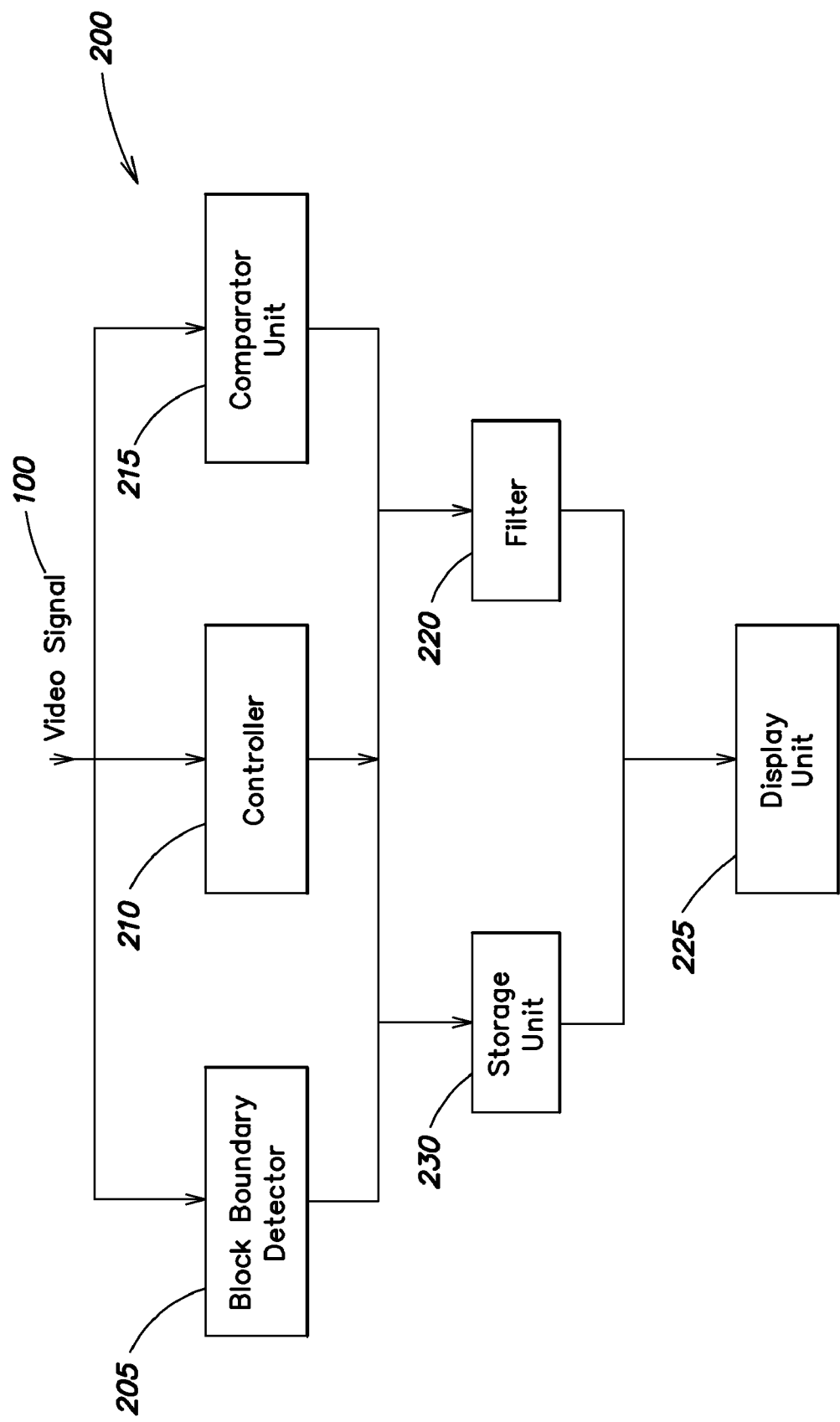
FIG. 2 is a diagram depicting a system of processing a video signal in accordance with an embodiment of the present invention.

FIG. 2 is a block diagram depicting a system 200 for processing a video signal in accordance with an embodiment of the present invention. A brief overview of the system 200 is now provided before aspects of that system are described in more detail below. In one embodiment, system 200 includes a block boundary detector 205 that performs a variety of complementary block boundary detection operations to identify and continuously refine and narrow a set of potential block boundaries. For example, block boundary detector 205 may perform an edge-based block boundary detection operation where patterns in pixel edge values are analyzed to identify potential block boundaries 110.

This edge-based set of potential block boundaries may be further narrowed by additional block boundary detection schemes. For example, after identifying potential block boundaries based on edge values, block boundary detector 205 may also perform a pixel component-based block boundary detection operation to identify potential block boundaries based on patterns of pixel component values. This supplemental potential block boundary detection is based on pixel component values, and not edge values. In one embodiment, pixels are deemed to form part of potential block boundaries 110 (i.e., to be along or adjacent to a potential block boundary) when both the edge-based and the pixel component-based block boundary detection schemes indicate the existence of a potential block boundary. Pixels can be considered to form part of potential block boundaries 110 when pixel component values are visually perceptible at or near potential block boundaries. These are examples of block boundary detection operations and additional complementary schemes may be implemented to further refine the list of potential block boundaries by identifying pixels that do not form part of these artifacts. In one embodiment, for a pixel to be identified as forming part of a potential block boundary 110, each block boundary detection scheme must indicate that the pixel forms part of a block boundary.

In this illustrative embodiment, pixels identified as forming part of a potential block boundary 110 that also form part of block boundary artifacts can be further processed, (for example, filtered,) while pixels of potential block boundary 110 that are not associated with block boundary artifacts can be maintained in an unfiltered form. For example, a controller 210 of system 200 may determine a boundary verification value that indicates a degree of confidence that a potential block boundary is indeed an actual block boundary with block boundary artifacts. This boundary verification value can indicate that the potential block boundary 110 will be either deemed to include block boundary artifacts whose component values are to be filtered, or deemed to include an edge or other non-artifact whose component values are to be maintained. As explained in more detail below, a filter 220 can filter pixel component values (e.g., luminance) of pixels that lie along potential block boundaries and whose components form visually perceptible block boundary artifacts, while maintaining (i.e., not filtering) component values of other pixels that are not associated with these artifacts.

Thus, it is to be understood that block boundary detector 205 may sample video signal 100 to test for discontinuities at block boundaries 110 that may be block boundary artifacts introduced during video signal 100 compression. In one embodiment, block boundary detector 205 detects a potential block boundary between first and second macroblocks of a frame of video signal 100. For example, block boundary detector 205 may sample edge values or component values such as luminance or chrominance, of pixels 105 to identify potential block boundaries 110 between any two blocks (or partial blocks) of a frame.

With respect to the edge-based block boundary detection scheme discussed above, in one embodiment, block boundary detector 205 includes a Sobel edge detector to detect regions of spatial frequency that may correspond to edges or to potential block boundaries. For example, block boundary detector 205 may sweep video signal 100 horizontally or vertically, sampling edge values of each pixel 105 in a row or column of a frame. In one embodiment, block boundary detector 205 includes a Sobel edge detector that uses the horizontal Sobel edge value Gx when performing horizontal potential block boundary detection, and vertical Sobel edge value Gy when performing vertical potential block boundary detection.

While in one embodiment, the edge values or pixel component values sampled by block boundary detector 205 include a luminance component, in various other embodiments any of chrominance, hue, saturation, or other component coefficients or values may be sampled. The results of the pixel evaluation by block boundary detector 205, as well as pixel offset values (indicative of a pixel's position within a macroblock), may also be accumulated and saved in an associated status register, memory device, or storage unit.

Continuing with the edge-based block boundary detection scheme discussed above, in one embodiment, to detect a potential block boundary, block boundary detector 205 determines an edge value of a plurality of pixels of video signal 100 and then examines those edge values to determine whether they are indicative of an edge or a potential block boundary. These edge values may be Sobel edge values when block boundary detector 205 includes a Sobel edge detector, although other types of edge detection could alternatively be used. For example, potential block boundary 110 may be identified by determining if rapidly changing regions of color or intensity contrast in a reconstructed image are edges that form part of the original image and are to be maintained, or if they are unwanted block boundaries 110 to be filtered out of displays of the reconstructed image. This can be done by use of a gradient operator that computes a two dimensional first derivative of this intensity change. By convolving the pixels of an image with a gradient operator an intensity gradient may be obtained where maximum or minimum peaks in this intensity gradient may be determined to correspond to image edges.

The location of these now-identified edges can then be more accurately determined by taking the second derivative of the first derivative to determine the rate of change in the intensity gradient. The areas of zero crossings resulting from the second derivative correspond to maximum or minimum peaks in the intensity gradient. Therefore, edge locations in a digital video signal can be determined by taking the first derivative of the intensity change between pixels that comprise one or more blocks, and these locations may then be refined be taking the second derivative of the intensity gradient to produce an edge value. The location of edges detected by determining a first derivative, (and in some cases, as refined by determining a second derivative) may then be used for edge based identification of potential block boundaries 110, and the portions of these potential block boundaries that include block boundary artifacts may then be filtered from displays of the image.

Figure 3:
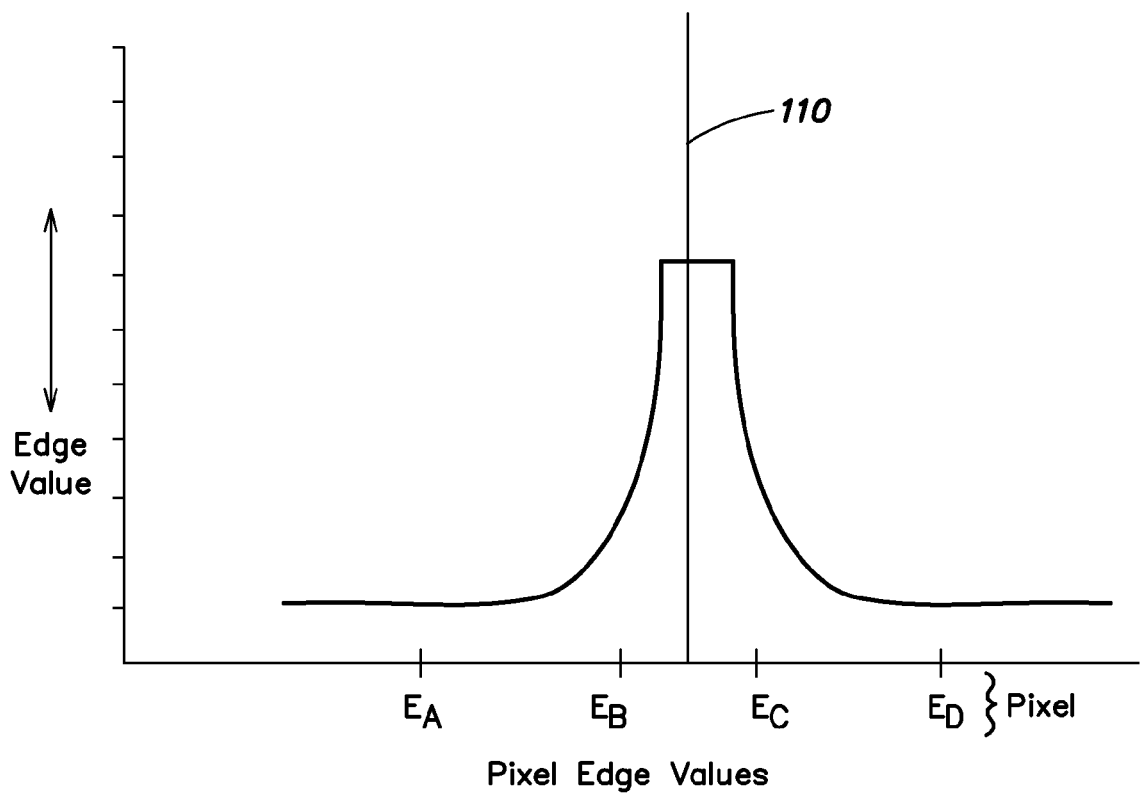
FIG. 3 depicts an edge value pattern indicative of a potential block boundary in accordance with an embodiment of the present invention.

With reference to FIG. 1, block boundary detector 205 can determine edge values of pixels A, B, C, and D. The edge values of pixels A, B, C, and D may be denoted as $E_A$ $E_B$ $E_C$ $E_D$. In one embodiment, block boundary detector 205 detects a potential block boundary by determining differentials in edge values of pixels 105. If those differentials in edge values satisfy certain criteria indicative of a block boundary, then the probability that potential block boundary 110 is an actual block boundary is increased. An example of edge values that indicate a block boundary is illustrated in FIG. 3, where an actual block boundary is depicted between pixels B and C as represented by their respective edge values. FIG. 3 generally illustrates an edge-based block detection pattern than can be identified by block boundary detector 205. As illustrated in FIG. 3, a block boundary exists between pixels B and C when the edge values of pixels B and C are relatively similar to each other, and also sufficiently distinct from the edge values of pixels A and D. This abrupt change in edge values, as illustrated in FIG. 3, can indicate the existence of a block boundary that may include an artifact. Further, as illustrated in FIG. 3, the edge values of pixels A and B, which are located on one side of the block boundary, are sufficiently different from each other, and the edge values of pixels C and D, which are located on the other side of the block boundary, are also sufficiently different from each other. This mirror-like pattern of a generally symmetrical and abrupt change in edge values may be indicative of the presence of a block boundary artifact along the line of symmetry, as illustrated in FIG. 3.

In one embodiment, block boundary detector 205 identifies and evaluates pixel edge values to detect the pattern illustrated in FIG. 3. For example, block boundary detector 205 may detect three differential values as indicated in equations 1-3 below.

$$\text{First differential value} = (E_B - E_A)/2 \quad\quad 1)$$

$$\text{Second differential value} = (E_C - E_D)/2 \quad\quad 2)$$

$$\text{Third differential value} = abs(E_C - E_B) \quad\quad 3)$$

In one embodiment where the first, second, and third differential values are calculated in accordance with equations 1-3 above, the differential values are compared against themselves and at least one threshold value, which may be stored in a programmable register, to detect at least one potential block boundary. For example, block boundary detector 205 may determine a possibility of a potential block boundary when the third differential value is less than the first differential value; or when the third differential value is less than the second differential value.

In one embodiment, when the third differential value is less than at least one of the first and second differential values such that it meets this first criterion, block boundary detector 205 determines next if two consecutive edge values, such as $E_B$ and $E_A$ for example, are sufficiently distinct from neighboring edge values (e.g., $E_C$ or $E_D$) in absolute terms. In this illustrative embodiment, block boundary detector 205 may evaluate edge values in accordance with equation 4 below, where the edge values are compared with a first block detector threshold value and there can be a potential block boundary (PBB) if:

$$PBB \text{ if}: (E_B - E_A) > blkdet\_thresh\_1 \text{ AND} (E_C - E_D) > blkdet\_thresh\_1 \quad\quad 4)$$

With reference to equation 4, there may be a potential block boundary between pixels B and C (see FIGS. 1 and 3) if the difference between both $E_B - E_A$ and $E_C - E_D$ is greater than a first threshold value. Differences in edge values $E_B - E_A$ and $E_C - E_D$ indicate that an increased probability that an edge or block boundary exists between pixels B and C, as illustrated in FIG. 3.

Continuing with this illustrative embodiment, the edge values may be further evaluated to determine if the boundary between pixels B and C is a block boundary that includes either an artifact that may be filtered or a non-artifact that may pass to a display unfiltered. In one embodiment, the edge values $E_B$ and $E_C$ are evaluated to ensure they do not exceed a second threshold value. If the edge values $E_B$ and $E_C$ exceed a second block detector threshold value, then the boundary between pixels B and C is most likely an edge, and not a block boundary. Accordingly, if edge values $E_B$ and $E_C$ are less than a second block detector threshold value in accordance with equation 5 below, then the boundary between pixels B and C may be a block boundary.

$$PBB \text{ if}: E_B < blkdet\_thresh\_2 \text{ AND} \\ E_C < blkdet\_thresh\_2 \quad\quad 5)$$

In one embodiment, block boundary detector 205 further evaluates pixel edge values against other criteria to identify pixel boundaries as either potential block boundaries or edges. For example, and with respect to equation 6 below, if all four edge values $E_A$ $E_B$ $E_C$ and $E_D$ are above a third block detector threshold value, then the boundary between pixels B and C is more likely to be an edge of the image, and not a potential block boundary artifact visible between two macroblocks of a frame.

$$EDGE \text{ if}: E_A > blkdet\_thresh\_3 \text{ AND}$$

$$E_B > blkdet\_thresh\_3 \text{ AND}$$

$$E_C > blkdet\_thresh\_3 \text{ AND}$$

$$E_D > blkdet\_thresh\_3;$$

$$else: PBB \quad\quad 6)$$

In one embodiment, to determine if there is a potential block boundary, an edge, or neither, between pixels B and C, block boundary detector 205 further compares the edge values of pixels B and C with a fourth threshold value as per equation 7 below.

$$PBB \text{ if}: E_B > blkdet\_thresh\_4 \text{ AND} \\ E_C > blkdet\_thresh\_4 \quad\quad 7)$$

In one embodiment, a programmable register may generate first, second, third, and fourth threshold values so that these threshold values may vary. In accordance with one embodiment, the fourth threshold value may be less than one third of the first threshold value, the first threshold value may be less than one sixth of the third threshold value, and the third threshold value may be less than half of the second threshold value. In one embodiment, in which the edge values are based on Sobel edge detection, the first threshold value is 16, the second threshold value is 400, the third threshold value is 128, and the fourth threshold value is 5. These numbers are illustrative and other configurations are possible.

It should be appreciated that edge-based block boundary detection operations may be insufficient to accurately identify a complete set of block boundaries. For example, edge-based pixel detection can be over inclusive, whereby pixels are falsely identified as forming block boundaries when, in fact, they do not. Thus, additional block boundary detection operations (e.g., pixel component pattern based operations) can be performed to improve block boundary detection.

In one embodiment, to more accurately identify whether a potential block boundary is an actual boundary, block boundary detector 205 can also detect pixel patterns, as opposed to edge values, within video signal 100. For example, pixel component values may differ substantially on opposite sides of a block boundary. With respect to FIG. 1, pixels A and B may have low pixel component values relative to and pixels C and D, which are part of another macroblock on the opposite side of block boundary 110. In this illustrative embodiment, block boundary detector 205 can identify first, second, and third pixel pattern values to more accurately identify whether a potential block boundary between two pixels of video signal 100 is in fact an actual block boundary. An example of pixel pattern values that indicate a potential block boundary is illustrated in FIG. 4, where an actual block boundary is between pixels B and C.

Figure 4:
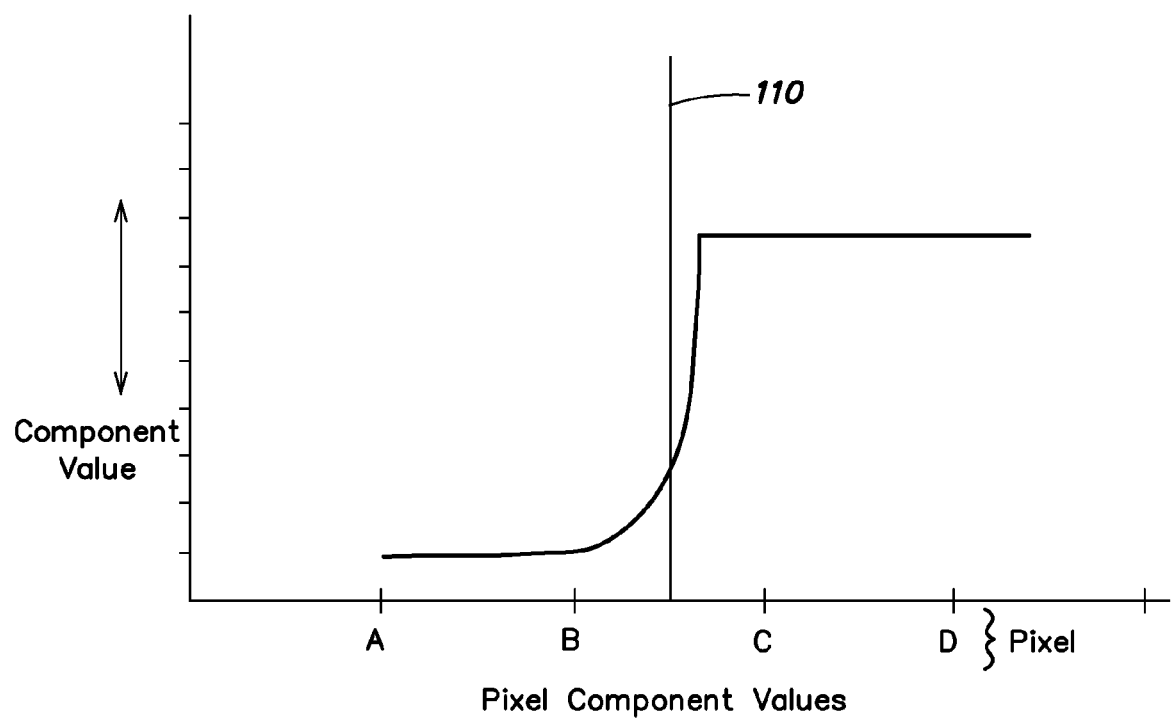
FIG. 4 depicts a pixel pattern indicative of a potential block boundary in accordance with an embodiment of the present invention.

FIG. 4 generally illustrates a pixel component-based block detection pattern than can be identified by block boundary detector 205. As illustrated in FIG. 4, a block boundary that may include an artifact exists between pixels B and C when the pixel component values of pixels C and D are relatively similar to each other, and also sufficiently distinct from the pixel component values of pixels A and B. This step-like abrupt change in pixel component values can indicate the existence of a block boundary that may include an artifact.

Block boundary detector 205 can identify and evaluate pixel component values to detect the pattern illustrated in FIG. 4. These pixel pattern values, and the other pixel pattern values described herein, are pixel component difference values that represent the difference in the values of pixel components. For example, the first, second, and third pixel pattern values b0, bp, and bq respectively, may be determined in accordance with equations 8-10 below.

$$1^{st} \text{ pixel pattern value } b0 = abs(B-C) \qquad (8)$$

$$2^{nd} \text{ pixel pattern value } bp = abs(A-B) \qquad (9)$$

$$3^{rd} \text{ pixel pattern value } bq = abs(C-D) \qquad (10)$$

In one embodiment, block boundary detector 205 compares the first, second, and third pixel pattern values with fourth and fifth block detector threshold values to determine if a block boundary exists between pixels B and C. For example, block boundary detector 205 may compare these pixel pattern values with fourth and fifth threshold values as per equation 11 to identify a potential block boundary (PBB).

$$\text{PBB if:} b0 < \text{blkdet\_thresh\_5 AND} \\ bp < \text{blkdet\_thresh\_6 AND } bq < \text{blkdet\_thresh\_6} \qquad (11)$$

In one embodiment, one or more programmable registers may store the fifth and sixth threshold values such that threshold values may vary. These threshold values may also be determined relative to each other. For example, the sixth threshold value may be less than one tenth of the fifth threshold value. In one embodiment, the fifth threshold value is 200, and the sixth threshold value is 16. These numbers are illustrative and other configurations are possible.

If the results of equation 11 indicate that a potential block boundary remains present, block boundary detector 205 can further refine the analysis by applying equation 12.

$$\text{PBB if:} (b0*2) > bp \text{ AND} (b0*2) > bq \qquad (12)$$

In one embodiment, the final Boolean result of equations 1-12 identifies a pixel as forming part of a potential block boundary (i.e., lying adjacent to a block boundary). For example, block boundary detector 205 may identify a pixel that forms part of a potential block boundary with a logic "1" and a pixel that does not form part of a potential block boundary with a logic "0". In this example, pixels that do not form part of a potential block boundary may form part of an edge of the image, or they may form part of the image that is neither an edge nor a potential block boundary.

It should be appreciated that equations 1-12 describe complementary edge-based and pixel component-based block boundary detection operations that can be performed by block boundary detector 205, and that further block boundary detection schemes can be implemented. These block boundary detection operations collectively increase the likelihood that a potential block boundary is indeed a block boundary. In one embodiment, a pixel must be identified as forming a block boundary (i.e., being adjacent to a block boundary) by all block boundary detections schemes to be identified as a potential block boundary. For example, a pixel that is defined as being adjacent to a block boundary based on the edge-based operations of equations 1-7 may, in this example, also need to be identified as being adjacent to a block boundary based on the pixel component operations of equations 8-12 to be considered a potential block boundary.

The complementary edge-based and pixel component-based block boundary detection operations may still falsely identify some pixels as forming block boundaries, when in fact they do not. In one embodiment, additional operations on pixels that form potential block boundaries increase the certainty with which it can be determined that the potential block boundaries are indeed actual block boundaries that may include artifacts. For example, some potential block boundaries may satisfy the criteria of equations 1-12 by wide margins, and thus may have a higher likelihood of being actual block boundaries. Other potential block boundaries may satisfy the criteria of equations 1-12, but by narrow margins, thus reducing the likelihood that these potential block boundaries are indeed actual block boundaries.

Thus, if the final Boolean result of equations 1-12 indicates that potential block boundary 110 exists, the systems and methods described herein proceed to determine a boundary verification value. The boundary verification value generally indicates, to varying degrees of confidence, whether or not the potential block boundary is indeed an actual block boundary that may include an artifact to be filtered from video signal 100, or something else, such as an edge or other non-artifact that forms part of the image and should be maintained in an unfiltered form. To determine the boundary verification value, block boundary detector 205 generally determines an offset parameter for each pixel of a frame, and then evaluates pixel information such as potential block boundaries associated with the pixels of each offset parameter. The resulting boundary verification value can be compared against a threshold or other criteria to definitively determine the status of the potential block boundary and, accordingly, what further action should be taken.

With respect to FIGS. 1 and 2, in one embodiment, pixels 105 of 8×8 macroblocks are classified with horizontal and vertical offset values between zero and seven. For example, in a horizontal sweep from left to right across an 8×8 macroblock, the leftmost pixel 105 (i.e., the first pixel in the macroblock encountered by block boundary detector 205 during its sweep), may have an offset of zero, the adjacent pixel to the right has an offset of one, the next pixel to the right in the same field line has an offset of two, etc. The offset values increment by one both horizontally and vertically p to seven and then repeat. Thus, for example, in FIG. 1, if pixel A has an offset of 6, then pixel B has an offset of seven, and pixel C, which on the opposite side of block boundary 110 and is part of a new macroblock, has an offset of zero, and pixel D has an offset of one. As discussed further herein, the number of potential block boundaries at each offset value can be evaluated to determine if potential block boundaries 110 are indeed actual block boundaries that may include block boundary artifacts.

In one embodiment, where frames of video signal 100 include 8×8 pixel macroblocks, to determine the boundary verification value, block boundary detector 205 identifies horizontal and vertical offset values for each of the pixels (e.g., offsets from zero to seven), and evaluates the pixels at each offset value to determine if the pixels that form part of potential block boundaries are indeed actual block boundaries. The results of these operations may be stored in one or more status registers. For example, block boundary detector 205 can evaluate pixels in the macroblock having an offset of zero by applying equations 1-12 to pixel component values, and can store the resulting number of potential block boundaries at offset zero in a status register. In this example, block boundary detector 205 may also evaluate pixels in the macroblock having an offset of one in the same manner. In one embodiment, this process can repeat until all pixels in a macroblock have been evaluated by offset and identified as forming or not forming part of potential block boundaries. These results can be stored in status registers. In one embodiment, offset values for each offset (e.g., zero to seven) are stored in a different status register.

Having identified offset values, block boundary detector 205 may evaluate pixels 105 in a horizontal direction or in a vertical direction to determine the number of potential block boundaries identified for each offset. For example, with respect to FIG. 1, block boundary detector 205 may evaluate pixels from left to right in a horizontal direction. In this example, with an 8×8 macroblock, offset values 0 to 7 are horizontal offset values. In another example, block boundary detector 205 may evaluate pixels from left to right in a vertical direction. In this example, with an 8×8 macroblock, offset values 0 to 7 are vertical offset values.

In one embodiment, the number of pixels that form part of potential block boundaries for each offset of an entire frame can be stored in the status register. For example, block boundary detector 205 may sweep a frame in both the horizontal and vertical directions, and identify pixels by both horizontal and vertical offsets. Continuing with this example, block boundary detector 205 can apply equations 1-12 to pixels of the frame during both horizontal and vertical operations, may sum the number of pixels at each offset that form part of both horizontal and vertical potential block boundaries. These pixels, organized by offset, can be stored in one or more status registers. For example, the number of pixels having horizontal offset h_0, h_1 ... h_7 of at least one macroblock that form part of horizontal potential block boundaries can be stored in a status register. Analogously, the number of pixels having vertical offset v_0, v_1 ... v_7 of at least one macroblock that form part of vertical potential block boundaries can be stored in a status register. In this example, the overall number of pixels forming part of horizontal and vertical potential block boundaries at each offset can be stored in status registers. It should be appreciated that orientations of horizontal, vertical, left, and right, are illustrative and that other positional and spatial orientations can occur.

In one embodiment, block boundary detector 205 evaluates pixels 105 to detect horizontal and vertical potential block boundaries in a frame of video signal 100. For example, if pixels 105 with a certain offset form part of a potential block boundary, this information may be stored in a status register as a logic 1, and if pixels 105 of a certain offset do not form part of a potential block boundary, this information may be stored in a status register as a logic 0. This can be repeated, for example by offset value, for all pixels of a frame, and the number of potential block boundaries for each offset and in each direction, (e.g., horizontal and vertical) can be aggregated. In this example, block boundary detector 205 can determine, for each offset value, the overall number of horizontal potential block boundaries and the overall number of vertical potential block boundaries.

With reference to FIG. 2, system 200 may also include at least one controller 210. In various embodiments, controller 210 may include one or more processors or logic circuits configured to implement the operations described herein. In one embodiment, controller 210 determines whether or not the potential block boundaries identified in equations 1-12 are indeed actual block boundaries that may or may not include block boundary artifacts. Potential block boundaries may include edges or other areas of contrast of the image that are part of the image and are not block boundary artifacts. These potential block boundaries that are part of the image (e.g. edges) and that are not block boundaries may occur throughout the frame of video signal 100. For example, these edges may occur within one or more macroblocks, or they may occur at boundaries of two or more macroblocks of a frame. Filtering pixels 105 that form block boundary artifacts can reduce visually perceptible distortion in a display of the image corresponding to video signal 100. However, filtering pixels 105 that do not form block boundary artifacts may degrade a display of the image, for example, by blurring portions of the image corresponding to edges.

In one embodiment, controller 210 evaluates the potential block boundaries to determine a level of confidence, i.e., a boundary verification value, which indicates whether or not the identified potential block boundaries include block boundary artifacts. Based on the boundary verification value, controller 210 may direct further signal processing operations, such as filtering or not filtering certain pixels of video signal 100.

To direct further signal processing operations, in one embodiment, controller 210 determines an offset parameter for at least one pixel of a frame of video signal 100. In one embodiment, controller 210 sums the number of potential block boundaries detected for each offset to determine which horizontal offset and which vertical offset has the highest number of potential block boundaries. For example, controller 210 may perform these operations as represented by equations 13 and 14 to identify a horizontal offset parameter.

$$\text{max\_}hblk\text{\_sum}=\max(hblk\text{\_sum\_statreg}[0\ldots 7]) \quad \quad 13)$$

$$\text{h\_offset}=\text{offset from statreg that produces max\_hblk\_sum} \quad \quad 14)$$

With respect to equations 13 and 14, in frames having 8×8 macroblocks, controller 210 sums the number of potential horizontal block boundaries for each offset zero to seven to identify the offset that has the most potential horizontal block boundaries. In one embodiment, controller 210 obtains this offset and potential block boundary information from at least one status register (e.g., statreg in the above equations). The offset having the highest number of potential horizontal block boundaries is the horizontal offset parameter of equation 14.

In one embodiment, controller 210 determines a vertical offset parameter, for example as represented by equations 15 and 16.

$$\text{max\_}vblk\text{\_sum}=\max(vblk\text{\_sum\_statreg}[0\ldots 7]) \quad \quad 15)$$

$$\text{v\_offset}=\text{offset from statreg that produces max\_vblk\_sum} \quad \quad 16)$$

With respect to equations 15 and 16, in frames having 8×8 macroblocks, controller 210 sums the number of potential vertical block boundaries for each offset zero to seven to identify the offset that has the most potential vertical block boundaries. In one embodiment, controller 210 obtains this offset and potential block boundary information from at least one status register (e.g., statreg in the above equations). The offset having the highest number of potential vertical block boundaries is the vertical offset parameter of equation 16. The number of potential block boundaries per offset may be summed in any direction for macroblocks of various sizes.

In the example of equations 13-16, h_offset is the offset value having the highest number of potential horizontal block boundaries, and v_offset is the offset value having the highest number of potential vertical block boundaries. In one embodiment, controller 210, having determined the offsets, (from for example offsets zero to seven) that produce the maximum number of potential block boundaries h_offset and v_offset, also determines the average value of all other offsets that do not produce h_offset and v_offset. For example, when evaluating pixels of a frame, offset three may produce the horizontal offset parameter h_offset, and offset six may produce the vertical offset parameter v_offset. In this example, controller 210 can average the number of potential horizontal block boundaries having offsets zero to two and four to seven, as well as the number of potential vertical block boundaries having offsets zero to five and seven to determine the average offset parameters in the horizontal and vertical directions. In this example, the average offset parameter values are calculated without including the offset parameter (e.g., h_offset or v_offset) having the highest number of potential block boundaries.

In some embodiments, controller 210 determines the boundary verification value by dividing the offset parameter by the average offset parameter, where the average does not include the offset having the highest number of potential block boundaries. In one embodiment, the boundary verification value can be clipped to a value between zero and eight. For example, in this embodiment, boundary verification values determined to be greater than eight may be clipped to a value of eight. The maximum boundary verification value of eight is an example, and other values, both greater than and less than eight may be used. In various embodiments, controller 210 determines horizontal and vertical boundary verification values. For example, the horizontal boundary verification value can be determined by dividing the horizontal offset parameter by the average horizontal offset parameter, and the vertical boundary verification value can be determined by dividing the vertical offset parameter by the average vertical offset parameter. In this example, and as described above, the average offset parameters are calculated without incorporating the offset parameter (e.g., h_offset or v_offset) having the highest number of potential block boundaries.

In one embodiment, relatively high boundary verification values of seven or eight may indicate a high confidence level that a potential block boundary includes a block boundary, and controller 210 may determine that the potential block boundary does include a block boundary. In another embodiment, controller 210 may determine that a potential block boundary does not include a block boundary when the boundary verification value is relatively low, such as zero or one. The cutoff point of the boundary verification value to determine whether or not the potential block boundary includes a block boundary may vary. For example, when the boundary verification values run from zero to eight, boundary verification values greater than four may indicate the presence of a block boundary, and boundary verification values less than four may indicate that the potential block boundary is an edge or something else that is not a block boundary. These numbers are examples and other numbers and cutoff points can be used.

In one embodiment, a boundary verification value of a frame can be adjusted based on offset parameters of a plurality of other frames of video signal 100. For example, if offset parameters for a plurality of previously evaluated frames are consistently the same or similar (e.g., within a certain range such as +/-10%) to the offset parameter of a frame under evaluation by controller 210, then the boundary verification value can be adjusted to increase the confidence level that a potential block boundary includes a block boundary artifact.

In some embodiments, consistently low offset parameters for a plurality of frames can indicate that the video signal does not include many block boundaries. For example, consistently low offset parameters may be the result of video compression schemes with a reduced number of artifacts such as block boundaries. This increases the probability that potential block boundaries detected by block boundary detector 205 do not include artifacts such as block boundary artifacts. In this example, consistently low offset parameters (e.g., below two on a scale of zero to eight for a given number of frames) can indicate that video signal 100 includes a minimal number of block boundaries, and that the likelihood that potential block do not include block boundary artifacts is increased. As a result, in this example, the boundary verification value can be adjusted downward.

System 200 may also include a comparator unit 215. In various embodiments, comparator unit 215 determines if the potential block boundary includes or does not include a block boundary artifact. In one embodiment, comparator unit 215 compares the boundary verification value and a boundary threshold value to determine whether the potential block boundary does indeed include a block boundary having a block boundary artifact. For example, the boundary verification value may be greater than the boundary threshold value, although other comparative relationships are possible. Continuing with this embodiment, controller 210 can identify one of pixels 105 whose components form part of a visually perceptible block boundary artifact. For example, controller 210 may identify a pixel associated with an artifact based on the pixel's offset parameter. Controller 210 may then provide information identifying this pixel to at least one filter 220 where components of the pixel or of adjacent pixels may be, for example, filtered to smooth the artifact located at the block boundary.

In one embodiment, comparator unit 215 compares the boundary verification value and the boundary threshold value and determines that at least part of the potential block boundary does not include a block boundary artifact. For example, the boundary verification value may be less than the boundary threshold value. Continuing with this embodiment, controller 210 can identify one of pixels 105 that forms part of the potential block boundary that does not form part of any actual block boundary artifact. For example, controller 210 may identify a pixel based on the pixel's offset parameter. Controller 210 may then provide information instructing that components of this pixel are not to be filtered, thus maintaining the image as encoded in video signal 100.

With respect to FIGS. 1 and 2, filter 220 may filter various components of pixels 105. In one embodiment, filter 220 adjusts pixel components values that can include luminance, chrominance, hue, saturation, contrast, or other components or coefficients. In one embodiment, filter 220 includes a deblocking filter to adjust luminance and chrominance (e.g., YUV) components of pixels 105.

In one embodiment, filter 220 operates in a four-pixel deblocking mode on all components of the images, (e.g., YUV). For example, with reference to pixels Z, A, B, C, D, and E of FIG. 1, which illustrates a frame having macroblocks that are 8×8 pixels, discrete cosine transform (DCT) block boundary 110 is between pixels B and C. In this illustrative embodiment, with 8×8 pixel macroblocks that have a total of 64 pixels, filter 220 evaluates pixels A, B, C, and D to determine pixel filter coefficients A', B', C', and D' per equations 17-20.

$$A'=(64*A-13*B+26*C-13*D)/64 \qquad (17)$$

$$B'=(6*A+32*B+45*C-19*D)/64 \qquad (18)$$

$$C'=(-19*A+45*B+32*C+6*D)/64 \qquad (19)$$

$$D'=(-13*A+26*B-13*C+64*D)/64 \qquad (20)$$

Figure 5:
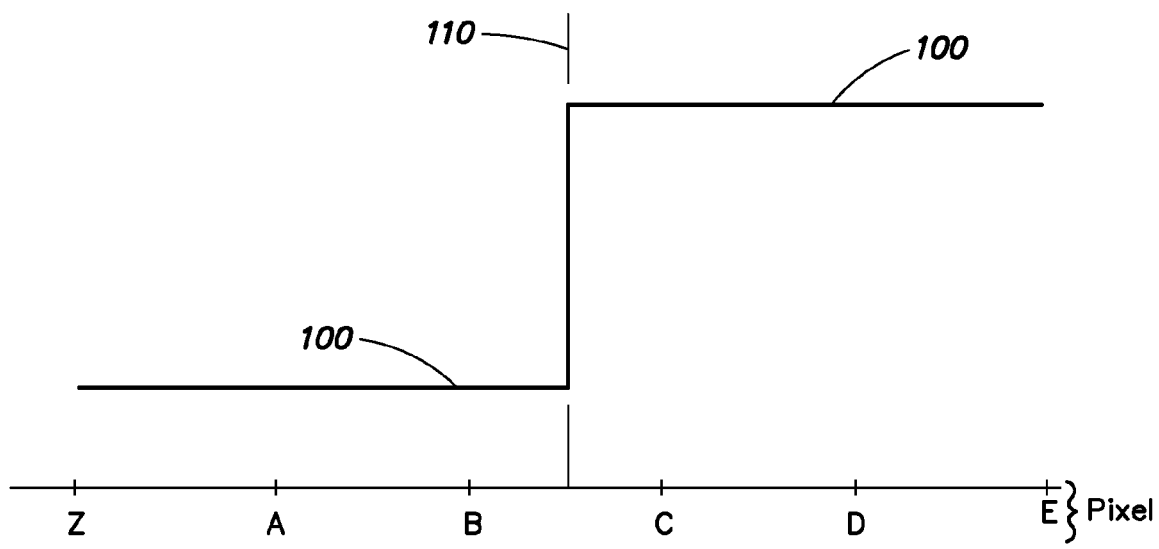
FIG. 5 depicts a video signal with a block boundary in accordance with an embodiment of the present invention.
Figure 6:
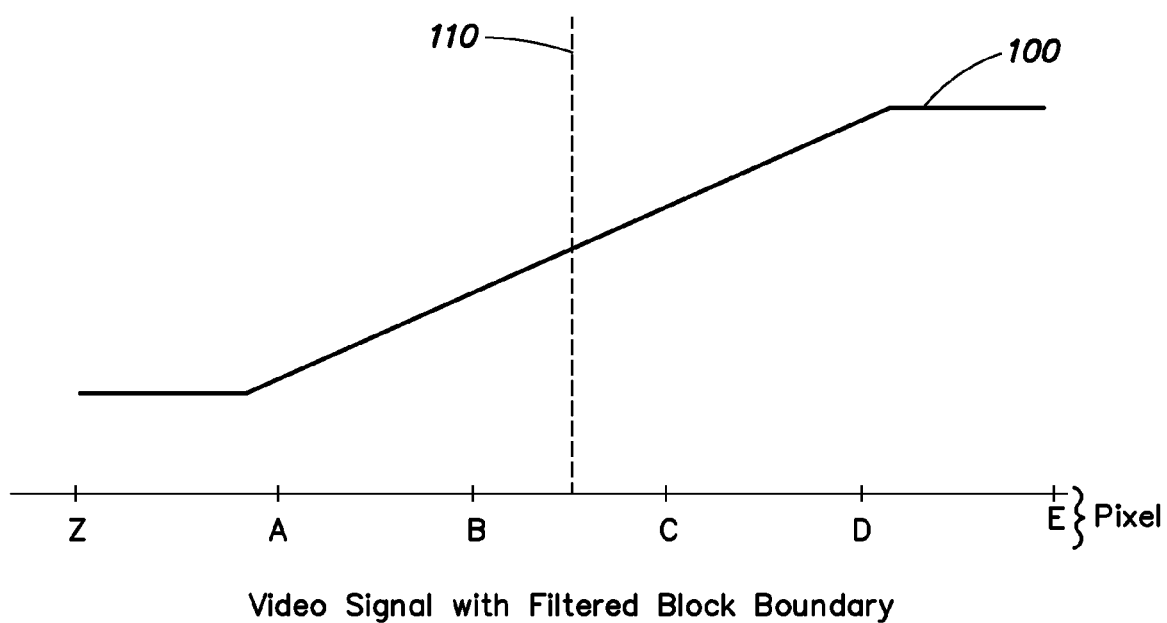
FIG. 6 depicts a video signal that has been filtered in accordance with an embodiment of the present invention.

In one embodiment, if filter 220 is to filter pixels A-D, then the results of equations 17-20, (A', B', C', and D') are the pixel component values to which the component values of those pixels can be filtered. For example, if pixel B is to be filtered, a component of pixel B (e.g., luminance or chrominance) may be filtered from B to B'. An example of filter 220 operating in a four filter mode of equations 17-20 is illustrated in FIGS. 5 and 6. In this example, FIG. 5 depicts video signal 100 in accordance with an embodiment that includes a block boundary artifact between pixels B and C. In one embodiment, filter 220 filters pixel component values of pixels A, B, C, and D. In this example, filter 220 smoothes video signal 100 to produce the filtered video signal depicted in FIG. 6, where component values of at least some of pixels A, B, C, and D have been adjusted or otherwise filtered. As illustrated in FIGS. 5 and 6, the step in pixel values (e.g. the luminance component value) of video signal 100 between pixels B and C that indicates the block boundary artifact has been filtered from video signal 100 to produce the smoothed video signal 100 of FIG. 6 where the step attributable to the block boundary artifact has been filtered. This may result, for example, in a blurring of the portion of the image associated with pixels B and C, which can reduce or eliminate the block boundary artifact that has been determined to be in the image along the potential block boundary.

Figure 7:
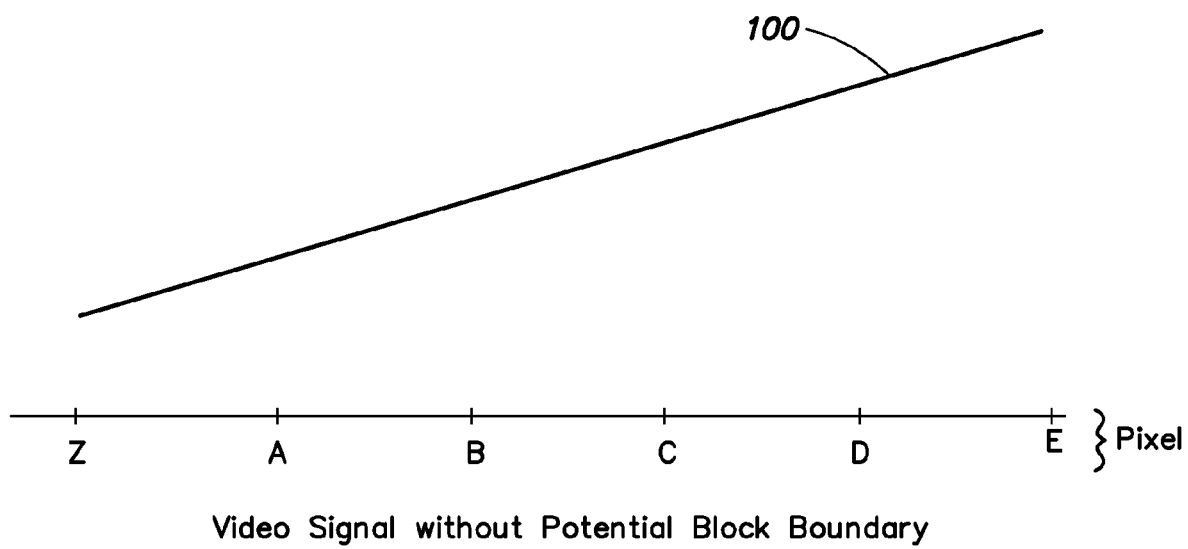
FIG. 7 depicts a video signal without a block boundary in accordance with an embodiment of the present invention.
Figure 8:
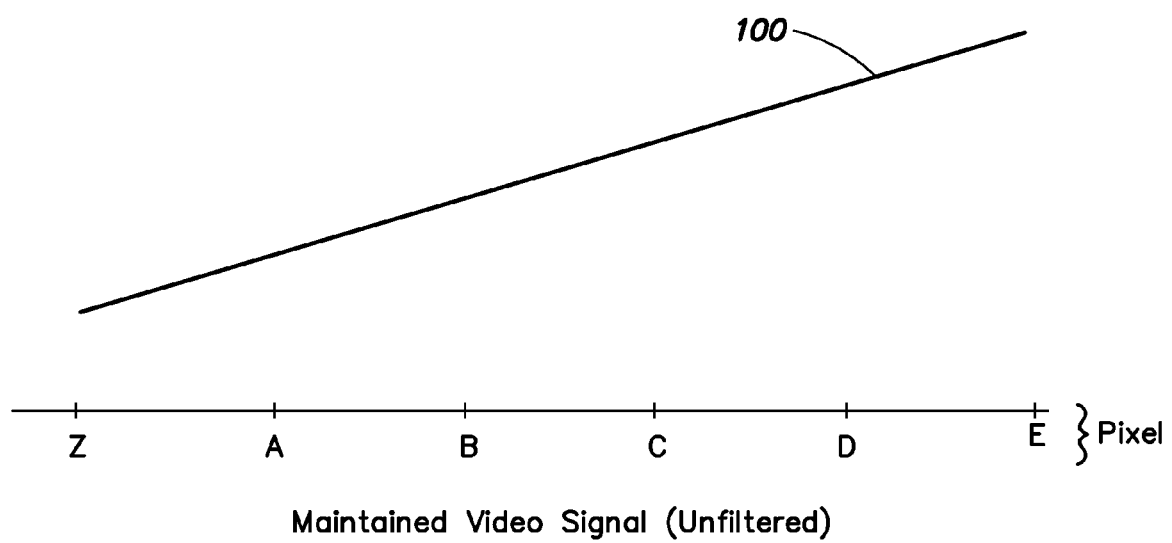
FIG. 8 and depicts a video signal that has been maintained in accordance with an embodiment of the present invention.

FIGS. 7 and 8 illustrate another embodiment where filter 220 operates in a four pixel mode in accordance with equations 17-20. As depicted in the example of FIG. 7, the smooth video signal 100 does not include a block boundary artifact between pixels B and C. In this embodiment, filter 220, by applying equations 17-20, maintains pixel coefficient values so that the maintained video signal of FIG. 8 is unfiltered and thus substantially similar or the same as video signal 100 of FIG. 7. In other words, filter 220, when operating in the four pixel mode can filter block boundaries artifacts from block boundaries of video signal 100 (e.g., FIGS. 5 and 6) when video signal 100 includes a block boundary artifact, and can maintain video signal 100 in unfiltered form (e.g., FIGS. 7 and 8) when block boundaries of video signal 100 do not include block boundary artifacts.

In one embodiment, with reference to FIGS. 1, 5, and 7, filter 220 identifies first, second, and third pixel pattern values of equations 21-23 below. In various embodiments, filter 220 may, but need not, implement these equations. For example, controller 210 may provide these pixel pattern values to filter 220, where pixel component values A, B, C, and D may include, for example, luminance or chrominance component values, or other component or coefficient values.

$$1^{st} \text{ pixel pattern value } b0=abs(B-C) \qquad (21)$$

$$2^{nd} \text{ pixel pattern value } bp=abs(A-B) \qquad (22)$$

$$3^{rd} \text{ pixel pattern value } bq=abs(D-C) \qquad (23)$$

In various embodiments, component value A" can be set equal to A; B" equal to B; C" equal to C; and D" equal to D. Filter 220 may then compare the first, second, and third pixel pattern values to deblocking thresholds to determine if any of pixels A, B, C, and D are to be filtered to A', B', C', or D' as per equations 17-20. For example, filter 220 may determine that pixel component values are to be maintained at A, B, C, and D when the first pixel pattern B0 is greater than or equal to a first deblocking threshold value; or when either of the second or third pixel pattern values bp or bq is greater than a second deblocking threshold value, as illustrated in equation 24.

$$\text{IF}(b0 \geq \text{deblock\_threshold\_1 OR}$$
$$bp \geq \text{deblock\_threshold\_2 OR}$$
$$bq \geq \text{deblock\_threshold\_2}) \text{THEN no filtering}$$

With reference to equation 24, video signal 100 may be maintained (e.g., not filtered) when the first pixel pattern value is greater than a first deblocking threshold, or when the second pixel pattern value is greater than a second deblocking threshold, or when the third pixel pattern value is greater than the second deblocking threshold. This example is illustrated in FIGS. 7 and 8, where video signal 100 is processed and maintained in unfiltered form.

With continued reference to equation 24, filter 220 may filter pixel component values A, B, C, and D to values A', B', C', and D' when the IF ... THEN statement of equation 24 is not satisfied (i.e., if none of the pixel pattern values are greater than the corresponding deblocking threshold). For example, if any of the first, second, or third pixel pattern values is less than its corresponding deblocking threshold, then filter 220 can filter pixel component values of pixels A, B, C, and D to their filtered values is determined in equations 17-20, with A" filtered to A'; B" filtered to B'; C" filtered to C'; and D" filtered to D'.

In one embodiment, first and second deblocking thresholds are included in one or more programmable registers. While their values vary, in one embodiment, first deblocking threshold deblock_threshold_1 has a default value of 200 in luma and 160 in chroma; and second deblocking threshold deblock_threshold_2 has a default value of 32 in luma and 8 in chroma.

In one embodiment, first and second deblocking thresholds are hard cutoffs used to determine when filter 220 will apply filtering to video signal 100. In a further embodiment, filter 220 can apply blended filtering to pixels when pixel values are near a threshold, but not sufficient to satisfy, for example, equation 24 above. For example, blended filtering may be milder than filtering that can occur when equation 24 is satisfied. In one embodiment, filter 220 performs a blending operation when pixel component values differ from at least one of the first and second deblocking thresholds by +/−4 for luma or +/−2 for chroma. Pixels falling within this range may still have component values that produce block boundary artifacts, but these block boundary artifacts may be less visually perceptible, and therefore require less filtering, than block boundary artifacts whose luma or chroma component values lie outside this range. These numbers are examples, and more or less blended filtering can occur by increasing or decreasing these tolerance ranges.

In one embodiment, filter 220 determines blended filter values $A_{FILT}$, $B_{FILT}$, $C_{FILT}$ and $D_{FILT}$ as per equations 25-28 below.

$$A_{FILT}=\text{Clip3}(A''-\text{deblock\_threshold\_3},A''+\text{deblock\_threshold\_3},A'') \qquad (25)$$

$$B_{FILT}=\text{Clip3}(B''-\text{deblock\_threshold\_3},B''+\text{deblock\_threshold\_3},B'') \qquad (26)$$

$$C_{FILT}=\text{Clip3}(C''-\text{deblock\_threshold\_3},C''+\text{deblock\_threshold\_3},C'') \quad (27)$$

$$D_{FILT}=\text{Clip3}(D''-\text{deblock\_threshold\_3},D''+\text{deblock\_threshold\_3},D'') \quad (28)$$

With respect to equations 25-28, Clip3(A, B, K)=A if K<A; B if K>B; and K otherwise. Continuing with this example, the filter values $A_{FILT}$, $B_{FILT}$, $C_{FILT}$ and $D_{FILT}$ may be blended with the boundary verification value to produce the final pixel component values to be used for pixels A, B, C, and D. These final pixel values $A_{FINAL}$, $B_{FINAL}$, $C_{FINAL}$ and $D_{FINAL}$ can be identified by filter 220 in accordance with equations 29-32 below, where bvv=the boundary verification value.

$$A_{FINAL}=(A_{FILT}*bvv+A*(8-bvv))/8 \quad (29)$$

$$B_{FINAL}=(B_{FILT}*bvv+B*(8-bvv))/8 \quad (30)$$

$$C_{FINAL}=(C_{FILT}*bvv+C*(8-bvv))/8 \quad (31)$$

$$D_{FINAL}=(D_{FILT}*bvv+D*(8-bvv))/8 \quad (32)$$

In various embodiments that implement equations 29-32, the horizontal boundary verification value is used for horizontal filtering by filter 220, and the vertical boundary verification value is used for vertical filtering by filter 220. With respect to equations 29-32, it should be appreciated that the amount of filtering can be varied based on the boundary verification value.

In one embodiment, filter 220 operates in a six-pixel deblocking mode where the pixel analysis of equations 17-32 is extended to six pixels Z, A, B, C, D, and E where three pixels are evaluated on each side of potential block boundary 110. For example, pixel filter coefficients used to determine Z' A', B', C', D', and E' can be those of table 1 below:

TABLE 1

| 40  | 32 | −18 | 16  | 11 | −17 |
|-----|----|-----|-----|----|-----|
| 16  | 32 | −3  | 16  | 24 | −21 |
| 16  | −4 | 24  | 32  | −9 | 5   |
| 5   | −9 | 32  | 24  | −4 | 16  |
| −21 | 24 | 16  | −3  | 32 | 16  |
| −17 | 11 | 16  | −18 | 32 | 40  |
| Z   | A  | B   | C   | D  | E   |

In this example, filter 220 evaluates pixels Z, A, B, C, D, and E to determine pixel filter coefficients Z', A', B', C', D', and E' analogous to equations 17-20 in the four-pixel deblocking example above. In this six-pixel deblocking example, in addition to the first, second, and third pixel pattern values of equations 21-23 above, filter 220 also determines fourth and fifth pixel pattern values ap and aq as per equations 33 and 34.

$$4^{th} \text{ pixel pattern value } ap=\text{abs}(Z-B) \quad (33)$$

$$5^{th} \text{ pixel pattern value } aq=\text{abs}(E-C) \quad (34)$$

In various embodiments, component value Z" can be set equal to Z; A" can be set equal to A; B" equal to B; C" equal to C; D" can be set equal to D; and E" can be set equal to E. Filter 220 may then compare the first through fifth, pixel pattern values (b0, bp, bq, ap, and aq) to deblocking thresholds to determine if any of pixels Z, A, B, C, D, and E are to be filtered to Z', A', B', C', D', or E'. For example, filter 220 may determine that pixel component values are to be maintained at Z, A, B, C, D, and E when the first pixel pattern B0 is greater than or equal to the first deblocking threshold value; or when any of the second, third, fourth, or fifth pixel pattern values bp, bq, ap, or aq is greater than the second deblocking threshold value, as illustrated in equation 35.

$$\begin{aligned}\text{IF}(b0 &\geq \text{deblock\_threshold\_1 OR}\\ bp &\geq \text{deblock\_threshold\_2 OR}\\ bq &\geq \text{deblock\_threshold\_2 OR}\\ ap &\geq \text{deblock\_threshold\_2 OR}\\ aq &\geq \text{deblock\_threshold\_2}) \text{THEN no filtering}\end{aligned} \quad (35)$$

With reference to equation 35, video signal 100 may be maintained (e.g., not filtered) when the first pixel pattern value is greater than the first deblocking threshold, or when any of the second, third, fourth, or fifth pixel pattern values is greater than the second deblocking threshold. This example is illustrated in FIGS. 7 and 8, where video signal 100 is processed and maintained in unfiltered form.

With continued reference to equation 35, filter 220 may filter pixel values Z, A, B, C, D, and E to values Z', A', B', C', D', and E' when the IF . . . THEN statement of equation 24 is not satisfied (i.e., if none of the pixel pattern values are greater than the corresponding deblocking threshold). For example, if any of the pixel pattern values is less than its corresponding deblocking threshold, then filter 220 can filter pixel component values of pixels Z, A, B, C, D, and E to their filtered values.

In one embodiment, filter 220 can apply blended filtering to pixels when pixel component values are near a threshold, but not sufficient to satisfy, for example, equation 35 above. For example, in addition to determining blended filter values $A_{FILT}$, $B_{FILT}$, $C_{FILT}$, and $D_{FILT}$ as per equations 25-28 above, filter 220 can also determine $Z_{FILT}$ and $E_{FILT}$ per equations 36 and 37.

$$Z_{FILT}=\text{Clip3}(Z''-\text{deblock\_threshold\_3},Z''+\text{deblock\_threshold\_3},Z'') \quad (36)$$

$$E_{FILT}=\text{Clip3}(E''-\text{deblock\_threshold\_3},E''+\text{deblock\_threshold\_3},E'') \quad (37)$$

Continuing with this example, the filter values may be blended with the boundary verification value to produce the final pixel component values to be used for pixels Z, A, B, C, D, and E. In addition to the final pixel values $A_{FINAL}$, $B_{FINAL}$, $C_{FINAL}$ and $D_{FINAL}$ from equations 29-32 above, filter 220 can identify final pixel values for pixels Z and E in six-pixel filtering mode in accordance with equations 38-39 below, where bvv=the boundary verification value.

$$Z_{FINAL}=(Z_{FILT}*bvv+Z*(8-bvv))/8 \quad (38)$$

$$E_{FINAL}=(E_{FILT}*bvv+E*(8-bvv))/8 \quad (39)$$

In various embodiments that implement equations 29-32, 38, and 39, the horizontal boundary verification value is used for horizontal filtering by filter 220, and the vertical boundary verification value is used for vertical filtering by filter 220.

It should be appreciated that filter 220 may operate in varying modes. For example, filter 220 may operate in any of zero, two, four, and six pixel modes of operation. In one embodiment, filter 220 filters pixel components in accordance with filtering algorithms defined in the H.264 standard.

In one embodiment, video signal 100 can be provided to display unit 225 for display to a viewer. Display unit 225 may include various screens or monitors, such as computer screens, television screens, LCD displays, plasma displays, mobile telephone displays, personal digital assistant or other displays. For example, display unit 225 may display video signal 100 post processing, i.e., after evaluation, control, filtering, and other processing operations have been performed on video signal 100 by at least one of block boundary detector 205, controller 210, comparator unit 215, and filter 220. In one embodiment, display unit 225 can display video signal 100 where some pixel component values have been filtered and others have been maintained in accordance with equations 1-39 above.

System 200 may also include at least one storage unit 230. In one embodiment, storage unit 230 includes one or more status registers. For example, threshold values may be stored in storage unit 230. Storage unit 230 may also include memory units to store the results of 2-dimensional gradient measurements made by block boundary detector 205. In various embodiments, storage unit 230 can be coupled to or associated with any of block boundary detector 205, controller 210, comparator unit 215, filter 220, and display unit 225. In one embodiment, storage unit 230 stores pixel component information, such as edge data, pixel component values (e.g., luminance or chrominance), pixel pattern values, boundary verification values, offset parameters, block boundary location, potential block boundary location, or threshold values. Storage unit 230 generally retains at least temporarily information contained in or derived from video signal 100, and information may be written to or read from storage unit 230.

Figure 9:
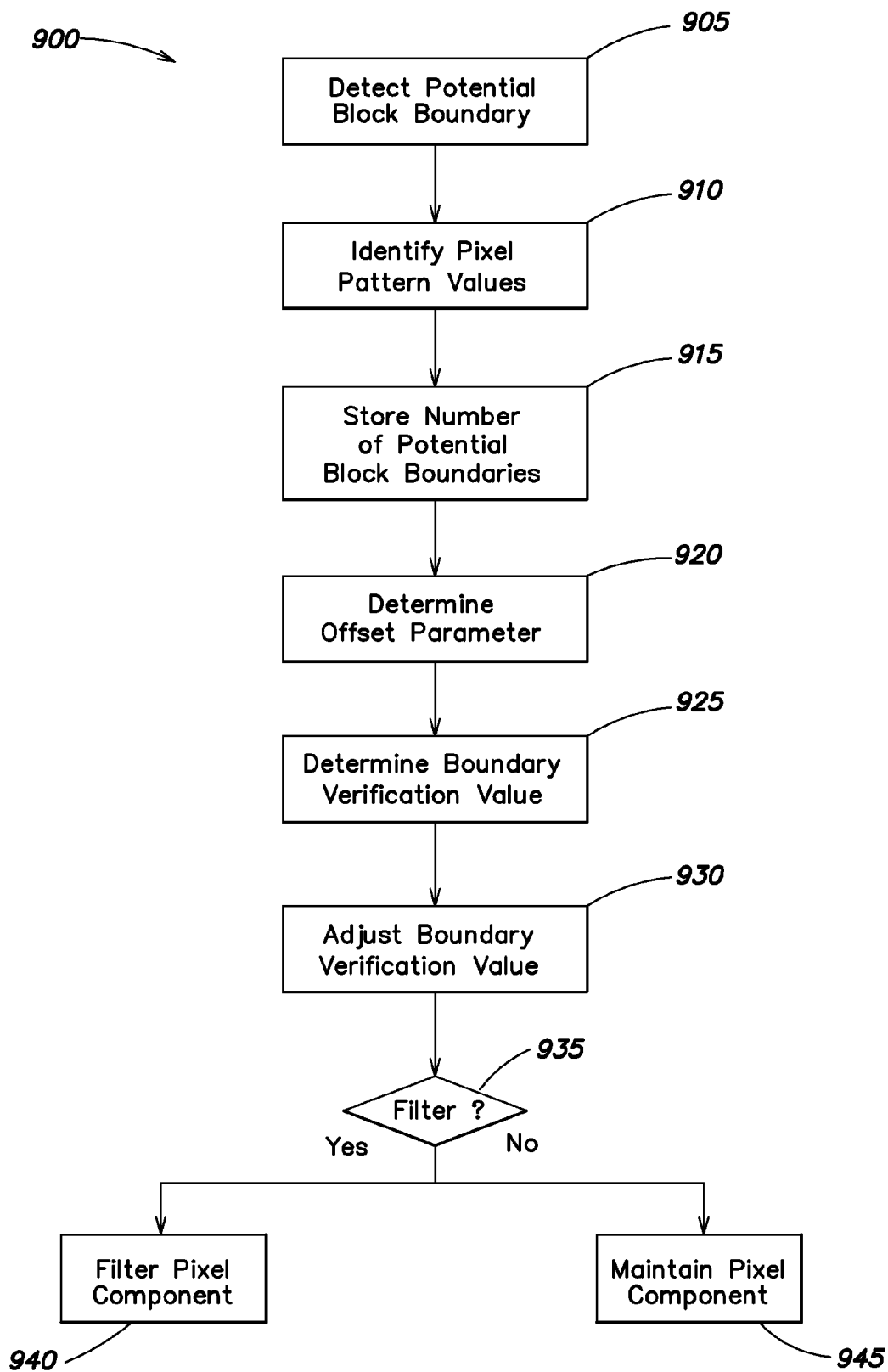
FIG. 9 is a flow chart depicting a method of processing a video signal in accordance with an embodiment of the present invention.

FIG. 9 is a flow chart depicting a method 900 of processing a video signal in accordance with an embodiment. A brief overview of the method 900 is now provided before acts of that method are described in more detail below. In one embodiment, method 900 performs a variety of block detection operations to identify and continuously refine and narrow a set of potential block boundaries. For example, method 900 may perform edge-based block boundary detection operations to identify potential block boundaries, and may complement these edge based operations with additional, pixel component-based operations that also detect potential block boundaries. In one embodiment, pixels are deemed to form part of potential block boundaries when both edge-based and pixel component-based block boundary detection schemes, as well as any additional block boundary detection operations, indicate the existence of a potential block boundary.

In this illustrative embodiment, a boundary verification value that indicates a degree of confidence that a potential block boundary is indeed an actual block boundary that may include a block boundary artifact may be determined. This boundary verification value can be used to determine that the potential block boundary is indeed an actual block boundary that may include block boundary artifacts whose component values are to be filtered. In addition, this boundary verification value may be provided to a filter that can adjust the degree of filtering based on characteristics of block boundary artifacts. As explained herein, component values (e.g., luminance) of pixels that form part of potential block boundaries that have artifacts can be filtered, while component values of other pixels that are not associated with these artifacts can be maintained in an unfiltered form (i.e., not filtered).

Method 900 includes an act of detecting at least one potential block boundary (ACT 905). Detecting a potential block boundary (ACT 905) may include analyzing a video signal to determine that portions thereof may, but need not, form a block boundary introduced, for example, during encoding of the video signal. Such a potential block boundary may occur between pixels of different macroblocks of a frame.

In one embodiment, detecting a potential block boundary (ACT 905) includes identifying pixel component values. In various embodiments, detecting a potential block boundary includes identifying component values of a plurality of consecutive pixels that form part of a row or column of the video signal frame. The consecutive pixels whose components are identified can collectively form part of one or more macroblocks. For example, four consecutive pixels in a row may form part of two macroblocks. In this example, the first and second pixels may be part of a first macroblock, and the second and third pixels may be part of another macroblock, with a potential block boundary between the second and third pixels so that the second and third pixels form part of the block boundary. In this example, detecting the potential block boundary (ACT 905) may include identifying component values of each of these four consecutive pixels. In other examples, more of fewer pixels may be evaluated, for example, six pixel component values may be evaluated, with three pixels in a first macroblock, and three pixels in a second macroblock that is adjacent to the first macroblock.

When detecting the potential block boundary (ACT 905) includes identifying pixel component values, method 900 may further include an act of identifying at least one pixel pattern value from amongst those pixel component values (ACT 910). The pixel pattern values may be, for example, in a pixel domain, such as luminance or chrominance, for example. In various embodiments, for every n pixels whose component values are sampled or identified, there can be n−1 pixel pattern values. For example, when pixel component values of four consecutive pixels are identified, identifying pixel pattern values (ACT 910) may include identifying first, second, and third pixel pattern values. In this example, the first pixel pattern value may be the absolute value of the difference between a component value of the second pixel and a component value of the third pixel. The second pixel pattern value may be the absolute value of the difference between component values of the first and second pixels. The third pixel pattern value may be the absolute value of the difference between the component value of the third pixel and the component value of the fourth pixel.

In one embodiment, component values of six consecutive pixels can be identified, with three consecutive pixels forming part of one macroblock, and another three consecutive pixels forming part of another macroblock. In this embodiment, identifying pixel pattern values (ACT 910) includes determining five pixel pattern values. For example, the first pixel pattern value can be the absolute value of a difference between the component value of the third pixel and the component value of the fourth pixel. The second pixel pattern value can be the absolute value of a difference between the component value of the second pixel and the component value of the third pixel. The third pixel pattern value can be the absolute value of a difference between the component value of the fifth pixel and the component value of the fourth pixel. The fourth pixel pattern value can be the absolute value of a difference between the component value of the first pixel and the component value of the third pixel. The fifth pixel pattern value can be the absolute value of a difference between the component value of the sixth pixel and the component value of the fourth pixel. These are examples, and other relationships between component values of consecutive pixels may be used to identify pixel pattern values (ACT 910).

The identified pixel pattern values (ACT 910) may be compared against one or more thresholds when determining the existence of at least one potential block boundary (ACT 905). For example, detecting a potential block boundary (ACT 905) may include determining that the first pixel pattern value is greater than or equal to one threshold value, and that the second and third pixel pattern values are greater than or equal to another threshold value. In some embodiments, the pixel pattern values may have relationships with respect to each other. For example, a potential block boundary may be detected (ACT 905) if the first pixel pattern value multiplied by two is greater than each of the second and third pixel pattern values.

In one embodiment, detecting a potential block boundary (ACT 905) includes performing a two dimensional gradient measurement on a component of at least one pixel of a frame of a video signal. Examples of pixel components include luminance, chrominance, hue, and saturation. When detecting a potential block boundary (ACT 905) by performing a two dimensional gradient measurement, results of a plurality of two dimensional gradient measurements may be accumulated and both the individual and accumulated results may be stored in a storage unit that may include a register.

In one embodiment, detecting a potential block boundary (ACT 905) includes determining an edge value of four consecutive pixels (e.g., four pixels in a row or column of a frame) where the first and second pixels are part of one macroblock, and the third and fourth pixels are part of another macroblock, with a potential block boundary located between the second and third pixels. Continuing with this illustrative embodiment, detecting the potential block boundary (ACT 905) can include identifying first, second, and third differential values based at least in part on the edge values of the four pixels. For example, the first differential value may be half of the difference between the edge values of the second and third pixels, which in this example can be located in different macroblocks. The second differential value may be half of the difference between the edge values of the third and fourth pixels, which in this example can be located in the same macroblock. Continuing with this example, the third differential value may be the absolute value of the difference in edge values of the third and second pixels. These differential values are examples and other relationships between the differential values are possible.

In one embodiment, differential values can be compared between themselves and a set of thresholds to detect potential block boundaries (ACT 905). For example, detecting a potential block boundary may include determining that the third differential value is less than the first differential value, or that the third differential value is less than the second differential value. In some embodiments, detecting a potential block boundary (ACT 905) includes determining if two consecutive edge values, corresponding to two consecutive pixels of a frame, are sufficiently distinct from neighboring pixels (or their edge values) to determine that a potential block boundary exists. For example, pixel edge values may be compared with one or more thresholds to make this determination.

In one embodiment, with four consecutive pixels where the first two are in one macroblock, and the second two are in a neighboring macroblock, detecting a potential block boundary (ACT 905) includes determining that a difference between the edge value of the second pixel and the edge value of the first pixel is greater than a first threshold value, and determining that the difference between the edge value of the third pixel and the edge value of the forth pixel is also greater than the first threshold value. It should be appreciated that determining the differences in these edge values, and comparing the differences to a threshold value, where a potential block boundary lies between the second and third pixels, may indicate that the two consecutive edge values may be distinct from edge values of neighboring pixels.

Continuing with this illustrative embodiment, if the center edge values exceed another threshold value, this may indicate that an edge, and not a block boundary, lies between the second and third pixels of four consecutive pixels with the first and second pixels in one macroblock and the third and fourth pixels in an adjacent macroblock. Thus, in one embodiment, detecting a potential block boundary (ACT 905) includes determining that the second and third pixel edge values are less than a second threshold value.

In one embodiment, if all four edge values of the same four consecutive pixels are greater than another threshold value, then at least some of the four pixels may form an edge, and not a block boundary, of the image. In this embodiment, detecting a potential block boundary (ACT 905) may include determining that edge values of each of the four consecutive pixels is greater than another threshold value. In some embodiments, edge values of consecutive pixels (e.g., the second and third pixels of the four pixels discussed above), must exceed another threshold to be determined to form at least part of a potential block boundary. For example, detecting a potential block boundary (ACT 905) may include determining that edge values of the second and third pixels are greater than another threshold value.

In one embodiment, method 900 includes an act of storing an indicator of a number of potential block boundaries (ACT 915). For example, detecting a potential block boundary may (ACT 905) may include detecting a plurality of potential block boundaries, or detecting a plurality of pixels that form part of at least one potential block boundary. In this example, information indicating how many potential block boundaries were detected (ACT 905) and where those potential block boundaries are located may be stored (ACT 915). In one embodiment, storing information indicating how many potential block boundaries were detected (ACT 915) includes storing this information in a storage unit such as computer memory or a status register.

Method 900 may also include an act of determining an offset parameter indicative of the location at which potential block boundaries are detected (ACT 920). Determining an offset parameter (ACT 920) generally identifies pixel position relative to other pixels in macroblocks of a frame of a video signal.

Determining offset parameters (ACT 920) may include determining offset parameters horizontally or vertically across macroblocks. In one embodiment, determining an offset parameter (ACT 920) includes determining an offset parameter that is the horizontal offset parameter h_offset (for example from zero to seven in an 8×8 macroblock) that produces the most horizontal potential block boundaries. For example, the second offset parameter may have more potential horizontal block boundaries than any other horizontal offset parameter. In this example, the determining the offset parameter (ACT 920) includes identifying the second offset parameter as the offset parameter.

In one embodiment, determining an offset parameter (ACT 920) includes determining an offset parameter that is the vertical offset parameter v_offset (for example from zero to seven in an 8×8 macroblock) that produces the most vertical potential block boundaries. For example, the seventh offset parameter may have more potential vertical block boundaries than any other vertical offset parameter. In this example, the determining the offset parameter (ACT 920) includes identifying the seventh offset parameter as the offset parameter. In one embodiment, offset parameters, such as the horizontal and vertical offset parameters, can be provided to deblocking filters.

In one embodiment, to determine if potential block boundaries are indeed block boundaries that may include artifacts or non-artifacts such as edges or other parts of the image, method 900 includes an act of determining at least one boundary verification value (ACT 925). Determining the boundary verification value (ACT 925) may be based on at least one offset parameter. Determining the boundary verification value (ACT 925) generally includes identifying a confidence level that at least part of the potential block boundary either includes an artifact such as a block boundary, or a non-artifact such as an edge. Determining the boundary verification value (ACT 925) may include determining boundary verification values for a frame of a video signal, or for individual macroblocks that form part of the frame.

In one embodiment, determining the offset parameter (ACT 920) includes determining the offset parameter that includes pixels with the most potential block boundaries. Continuing with this embodiment, determining the boundary verification value (ACT 925) can include determining the average number of pixels having potential block boundaries in each of the other offsets, (i.e., all of the offsets except the offset associated with the highest number of potential block boundaries). For example, during evaluation of the frame in a horizontal direction, pixels having a horizontal offset value of two (of offset values zero through seven) may form part of more potential block boundaries than pixels having any other horizontal offset value. In this example, determining the boundary verification value (ACT 925) may include determining an average number of potential block boundaries for each of the other horizontal offset values (i.e., zero, one, and three through seven in this example). In this example, determining the boundary verification value (ACT 925) can include determining a maximum value that is the highest number of potential block boundaries in one of the offsets, as well as determining an average value that is the average number of potential block boundaries for all of the other offsets, i.e., for each offset except the offset having the highest number of potential block boundaries.

In one embodiment, determining the boundary verification value (ACT 925) includes dividing the maximum value that is the highest number of potential block boundaries of one of the offsets by the average number of potential block boundaries by each of the other offsets. For example, if offset number two is associated with the most potential block boundaries, then the number of potential block boundaries at the second offset may be divided by the number of potential block boundaries at each other offset, e.g., zero, one, three . . . through the last offset value that may be seven in one example. In one embodiment, this produces the boundary verification value, which can indicate a degree of confidence that one or more potential block boundaries is or is not a block boundary.

Method 900 may also include an act of adjusting the boundary verification value (ACT 930). For example, the boundary verification value may be limited to a maximum value or to a range of values, e.g., the boundary verification value may be clipped to a number between zero and eight, even if results of the division operation discussed above are greater than eight. This range is an example, and boundary verification values can have other ranges greater or less than a range of zero to eight.

In one embodiment, adjusting the boundary verification value (ACT 930) can be based on an evaluation of a plurality of boundary verification values. For example, a boundary verification value may be determined (ACT 925) for a plurality of frames. In this example, the boundary verification value of one frame may be adjusted based on an evaluation of the boundary verification of the other frames. In this example, a plurality of consecutive frames may have a consistently low boundary verification value, which may indicate a high quality video signal that is substantially free of block boundaries. In this example, if one frame has a high boundary verification value inconsistent with the boundary verification values of the other frames, the boundary verification value of that frame may be adjusted downward, indicating that its associated potential block boundaries are less likely to be block boundaries and more likely to be edges or non-artifact parts of the image. Adjusting the boundary verification value (ACT 930) may include increasing or decreasing this value based on additional factors than those used when determining the boundary verification value (ACT 925). For example, adjusting the boundary verification value (ACT 930) may include analyzing information about video signal quality, edge detection, boundary verification values of other frames of the video signal, display parameters, or pixel component values.

In one embodiment, method 900 includes an act of determining whether or not to filter the video signal (ACT 935). For example, if the potential block boundary includes a block boundary artifact, then this block boundary artifact is to be filtered. In another example, if the potential block boundary (or portion thereof) does not include a block boundary artifact, then that portion is to be maintained in unfiltered form.

In one embodiment, determining whether or not to filter the video signal (ACT 935) includes comparing the boundary verification value to a threshold value to determine that the potential block boundary does indeed include a block boundary artifact. For example, if the boundary verification value is between zero and eight, the boundary threshold value may be four. In this example, boundary verification values between four and eight may indicate with a high degree of confidence that at least a portion of a potential block boundary includes a block boundary artifact, and boundary verification values between zero and four may indicate with a high degree of confidence that at least a portion of a potential block boundary does not include a block boundary artifact. This is an example, and other boundary verification values and boundary threshold values may be used.

In one embodiment, determining whether or not to filter the video signal (ACT 935) includes identifying a pixel that forms part of the block boundary artifact. A pixel that forms part of the block boundary artifact may be a pixel adjacent to the potential block boundary. The pixel that forms part of the block boundary artifact may also be a pixel whose components form part of a visually perceptible artifact along a potential or actual block boundary.

In one embodiment, determining if the potential block boundary includes a block boundary artifact, determining whether or not to filter the video signal (ACT 935) includes comparing the boundary verification value to the boundary threshold value to determine the extent to which at least one pixel corresponding to the block boundary artifact is to be filtered.

Method 900 may include an act of filtering a component of a pixel (ACT 940). For example, components such as luminance, chrominance, hue, saturation, contrast, or coefficients of pixels that form part of a block boundary artifact or other artifact, (e.g., ringing noise or jaggies) may be filtered (ACT 940) from a video signal. These deblocking and other filtering operations reduce or eliminate artifacts from a displayed video signal, rendering the display more appealing to a viewer. Filtering a pixel component (ACT 940) may include adjusting pixel components by, for example, increasing or decreasing them.

In one embodiment, filtering pixel components (ACT 940) includes filtering component values of at least one of four consecutive pixels of a video signal frame. For example, when a pixel forms part of a block boundary artifact, pixel components may be filtered (ACT 940) based on a comparison of pixel pattern values and filtering threshold values. In one embodiment, filtering pixel components (ACT 940) includes identifying a pixel component value as being within a range of a filtering threshold value. In this embodiment, filtering the pixel component (ACT 940) includes adjusting the component value that is within range of the filtering threshold value. This adjustment may be based on, for example, the boundary verification level.

Filtering a pixel component (ACT 940) may include evaluating component values and pixel pattern values of a plurality of consecutive pixels, as well as comparing any of these values with one or more filtering thresholds. For example, a potential block boundary may exist between any two of at least six consecutive pixels. These consecutive pixels may form, for example, a row across one or more macroblocks of a frame of the video signal. In this example, a plurality of pixel pattern values may be determined as described above. In one embodiment, five pixel pattern values may be determined among the six consecutive pixels. In this embodiment, when one of the pixels forms part of a block boundary artifact, filtering the pixel component (ACT 940) may include filtering a component of the pixel forming part of the artifact when one pixel pattern value is less than one filtering threshold value, and when at least one of the other pixel pattern values is less than another filtering threshold value.

Method 900 may include an act of maintaining a component of a pixel (ACT 945). Maintaining pixel components (ACT 945) may include, for example, maintaining components such as luminance, chrominance, hue, saturation, contrast, or coefficients of pixels that do not form part of a block boundary artifact in an unfiltered from. Such a pixel may form part of a potential block boundary. In this example, pixel component values may be displayed unfiltered. In one embodiment, a high quality video signal may have minimal artifacts such as block boundaries. Unnecessarily filtering pixel component values that are part of the image, (e.g., edges) and not artifacts such as block boundary artifacts, can result in blurring or other unwanted visual degradation of the display of a video signal. Maintaining pixel components (ACT 945) can, in one embodiment, limit filtering to portions of a video signal that include artifacts. This avoids unnecessary filtering of the video signal, improving its quality. For example, when at least part of a potential block boundary is part of the image, and not a block boundary artifact, pixel component values of the potential block boundary may be maintained, preserving, for example, the edge of the image in an unfiltered form.

In one embodiment, when component values of four consecutive pixels are determined and the first, second, and third pixel pattern values are determined based on the four consecutive pixel component values as described above, maintaining at least one pixel component value (ACT 945) may include maintaining one of the four pixel values in unfiltered form when the first pixel pattern value is greater than or equal to a first filtering threshold value, and when the second and third pixel pattern values are greater than or equal to a second filtering threshold value.

In some embodiments, when component values of six consecutive pixels are determined and the first, second, third, fourth, and fifth pixel pattern values are determined based on the six consecutive pixel component values as described above, maintaining at least one pixel component value (ACT 945) may include maintaining one of the six pixel values in unfiltered form when the first pixel pattern value is greater than or equal to the first filtering threshold value, and when the other (e.g., second through fifth) pixel pattern values are each greater than or equal to the second filtering threshold value. These relationships between pixel pattern values are examples. Maintaining pixel components (ACT 945) may include preserving pixel component values of any pixel that is not part of an artifact in an unfiltered form. For example a filter may allow at least part of the video signal to pass through the filter without being filtered. Alternatively, at least a portion of the video signal may circumvent a filter and be displayed without having passed through the filter.

Note that in FIGS. 1 through 9, the enumerated items are shown as individual elements. In actual implementations of the systems and methods described herein, however, they may be inseparable components of other electronic devices such as a digital computer. Thus, actions described above may be implemented at least in part in software that may be embodied in an article of manufacture that includes a program storage medium. The program storage medium includes data signals embodied in one or more of a carrier wave, a computer disk (magnetic, or optical (e.g., CD or DVD, or both), non-volatile memory, tape, a system memory, and a computer hard drive.

From the foregoing, it will be appreciated that the systems and methods described herein form an effective way to process a video signal. Potential block boundaries can be detected and a confidence level that the potential block boundaries are indeed block boundaries can be determined. A filter can be provided to selectively filter block boundaries and other artifacts while maintaining portions of the video signal that may not include these artifacts in a non-filtered form. Whether and to what degree the video signal is filtered can depend on the confidence level that the potential block boundary is an actual block boundary that includes a block boundary artifact. This improves the quality of video signals.

Any references to horizontal and vertical, front and back, left and right, top and bottom, and upper and lower are intended for convenience of description, not to limit the present systems and methods or their components to any one positional or spatial orientation.

Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements.

Any embodiment disclosed herein may be combined with any other embodiment, and references to "an embodiment", "some embodiments", "an alternate embodiment", "various embodiments", "one embodiment" or the like are not necessarily mutually exclusive and are intended to indicate that a particular feature, structure, or characteristic described in connection with the embodiment may be included in at least one embodiment. Such terms as used herein are not necessarily all referring to the same embodiment. Any embodiment may be combined with any other embodiment in any manner consistent with the objects, aims, and needs disclosed herein.

References to "or" may be construed as inclusive so that any terms described using "or" may indicate any of a single, more than one, and all of the described terms.

One skilled in the art will realize the systems and methods described herein may be embodied in other specific forms without departing from the spirit or essential characteristics thereof. For example, embodiments described herein can employ other equations and acts, such as inverses of the greater than or less than comparisons described herein that may have the same logical result. Further, embodiments described herein can function with different threshold values, or different ways in which threshold values, pixel component values, and pixel pattern values are compared or evaluated. The foregoing embodiments are therefore to be considered in all respects illustrative rather than limiting of the described systems and methods. Scope of the systems and methods described herein is thus indicated by the appended claims, rather than the foregoing description, and all changes that come within the meaning and range of equivalency of the claims are therefore intended to be embraced therein.

What is claimed is:

1. A method of processing a video signal, comprising acts of:
   detecting a potential block boundary between a first block and a second block of a frame of the video signal, wherein the frame, the first block, and the second block each includes a plurality of pixels;
   determining an offset parameter corresponding to at least one pixel of at least one of the first block and the second block;
   determining, based on the offset parameter, a boundary verification value of at least one of the first block and the second block;
   determining, based on the boundary verification value, if the potential block boundary includes a block boundary artifact; and
   filtering a component value of a pixel that forms part of the block boundary artifact in response to determining that the potential block boundary includes the block boundary artifact, wherein the act of filtering includes computing an adjusted component value of the pixel based on a function of the component value of the pixel, a filtered component value of the pixel and the boundary verification value.

2. The method of claim 1, wherein the act of determining if the potential block boundary includes the block boundary artifact includes:
   comparing the boundary verification value to a boundary threshold value to determine that the potential block boundary includes the block boundary artifact; and
   identifying, from the plurality of pixels and the offset parameter, the pixel that forms part of the block boundary artifact.

3. The method of claim 1, wherein the act of determining if the potential block boundary includes the block boundary artifact includes:
   comparing the boundary verification value to a boundary threshold value to determine that the potential block boundary does not include the block boundary artifact; and
   identifying, from the plurality of pixels, a pixel that forms part of the potential block boundary and that does not form part of the block boundary artifact; and
   wherein the method further comprises maintaining a component of the pixel that does not form part of the block boundary artifact in an unfiltered form.

4. The method of claim 1, wherein the frame of the video signal includes a plurality of rows and a plurality of columns, each row and each column including at least one pixel, and wherein the act of detecting the potential block boundary includes:
   determining an edge value of each pixel of four consecutive pixels of one of the plurality of rows and the plurality of columns, wherein the first and second pixels are included in the first block, wherein the third and fourth pixels are included in the second block, and wherein the second and third pixels form part of the potential block boundary;
   identifying a first differential value that is one half of the difference of the edge values of the second pixel and the first pixel;
   identifying a second differential value that is one half of the difference of the edge values of the third pixel and the fourth pixel; and
   identifying a third differential value that is an absolute value of the difference of the edge values of the third pixel and the second pixel.

5. The method of claim 4, wherein the act of detecting the potential block boundary includes:
   determining that the third differential value is less than at least one of the first differential value and the second differential value;
   determining that a difference between the edge value of the second pixel and the edge value of the first pixel is greater than a first threshold value; and
   determining that a difference between the edge value of the third pixel and the edge value of the fourth pixel is greater than the first threshold value.

6. The method of claim 5, wherein the act of detecting the potential block boundary includes:
   determining that the edge value of the second pixel is less than a second threshold value; and
   determining that the edge value of the third pixel is less than the second threshold value.

7. The method of claim 6, wherein the act of detecting the potential block boundary includes:
   determining that the edge value of each of the four consecutive pixels is greater than a third threshold value;
   determining that the edge value of the second pixel is greater than a fourth threshold value; and
   determining that the edge value of the third pixel is greater than the fourth threshold value.

8. The method of claim 1, further comprising:
   adjusting the boundary verification value based at least in part on a second boundary verification value of a block of a second frame of the video signal.

9. The method of claim 1, wherein the frame of the video signal includes a plurality of rows and a plurality of columns, each row and each column including at least one pixel, the method further comprising:
   identifying a component value of each pixel of four consecutive pixels of one of the plurality of rows and the plurality of columns, wherein the first and second pixels are included in the first block, wherein the third and fourth pixels are included in the second block, and wherein the second and third pixels form part of the potential block boundary;
   identifying a first pixel pattern value that is an absolute value of a difference between the component value of the second pixel and the component value of the third pixel;
   identifying a second pixel pattern value that is an absolute value of a difference between the component value of the first pixel and the component value of the second pixel;
   identifying a third pixel pattern value that is an absolute value of a difference between the component value of the fourth pixel and the component value of the third pixel; and
   maintaining at least one of the component values of at least one of the four consecutive pixels in unfiltered form when at least one of:
      the first pixel pattern value is greater than or equal to a first filtering threshold value;
      the second pixel pattern value is greater than or equal to a second filtering threshold value; and
      the third pixel pattern value is greater than or equal to the second filtering threshold value.

10. The method of claim 1, wherein the frame of the video signal includes a plurality of rows and a plurality of columns, each row and each column including at least one pixel, the method further comprising:
- identifying a component value of each pixel of four consecutive pixels of one of the plurality of rows and the plurality of columns, wherein the first and second pixels are in the first block, wherein the third and fourth pixels are in the second block, and wherein the second and third pixels form part of the potential block boundary;
- identifying a first pixel pattern value that is an absolute value of a difference between the component value of the second pixel and the component value of the third pixel;
- identifying a second pixel pattern value that is an absolute value of a difference between the component value of the first pixel and the component value of the second pixel;
- identifying a third pixel pattern value that is an absolute value of a difference between the component value of the fourth pixel and the component value of the third pixel; and
- wherein the act of filtering further includes filtering at least one of the component values of at least one of the four consecutive pixels when:
  - the first pixel pattern value is less than a first filtering threshold value;
  - the second pixel pattern value is less than a second filtering threshold value; and
  - the third pixel pattern value is less than the second filtering threshold value.

11. The method of claim 10, wherein filtering the at least one of the component values further includes:
- identifying one of the component values of the four consecutive pixels as being within a range of one of the first filtering threshold value and the second filtering threshold value; and
- adjusting the one component value within the range of one of the first and second filtering threshold values based on the boundary verification value.

12. A system for processing a video signal, comprising:
- a block boundary detector configured to detect a potential block boundary between a first block and a second block of a frame of the video signal, wherein the frame, the first block, and the second block each include a plurality of pixels;
- a controller configured to:
  - determine an offset parameter corresponding to at least one pixel of at least one of the first block and the second block;
  - determine, based on the offset parameter, a boundary verification value of at least one of the first and second blocks; and
  - determine, based on the boundary verification value, if the potential block boundary includes a block boundary artifact; and
- a filter configured to adjust a component value of a pixel that forms part of the block boundary artifact in response to determining that the potential block boundary includes the block boundary artifact, wherein the filter is further configured to compute an adjusted component value of the pixel based on a function of the component value of the pixel, a filtered component value of the pixel and the boundary verification value.

13. The system of claim 12, further comprising:
- a comparator unit configured to determine, based on the boundary verification value and a boundary threshold value, that the potential block boundary includes the block boundary artifact;
- wherein the controller is configured to identify the pixel of the plurality of pixels that forms part of the block boundary artifact.

14. The system of claim 12, further comprising:
- a comparator unit configured to determine, based on the boundary verification value and a boundary threshold value, that the potential block boundary does not include the block boundary artifact;
- wherein the controller is configured to identify a pixel of the plurality of pixels that forms part of the potential block boundary and that does not form part of the block boundary artifact; and
- wherein the filter is configured to maintain a component value of the pixel that does not form part of the block boundary artifact.

15. The system of claim 12, wherein the frame of the video signal includes a plurality of rows and a plurality of columns, each row and each column including at least one pixel, further comprising:
- the block boundary detector configured to determine an edge value of each pixel of four consecutive pixels of one of the plurality of rows and the plurality of columns, wherein the first and second pixels are included in the first block, wherein the third and fourth pixels are included in the second block, and wherein the second and third pixels form part of the potential block boundary;
- wherein the block boundary detector is further configured to determine:
  - a first differential value that is one half of the difference of the edge values of the second pixel and the first pixel;
  - a second differential value that is one half of the difference of the edge values of the third pixel and the fourth pixel; and
  - a third differential value that is an absolute value of the difference of the edge values of the third pixel and the second pixel.

16. The system of claim 15, wherein the block boundary detector is further configured to determine that:
- a difference between the edge value of the second pixel and the edge value of the first pixel is greater than a first threshold value; and
- a difference between the edge value of the third pixel and the edge value of the fourth pixel is greater than the first threshold value.

17. The system of claim 16, wherein the block boundary detector is further configured to determine that the edge value of the second pixel is less than a second threshold value, and that the edge value of the third pixel is less than the second threshold value.

18. The system of claim 17, wherein the block boundary detector is further configured to determine that the edge value of each of the four consecutive pixels is greater than a third threshold value, that the edge value of the second pixel is greater than a fourth threshold value, and that the edge value of the third pixel is greater than the fourth threshold value.

19. The system of claim 18, wherein the block boundary detector is further configured to identify:
- a first pixel pattern value that is an absolute value of a difference between a component value of the second pixel and a component value of the third pixel;
- a second pixel pattern value that is an absolute value of a difference between a component value of the first pixel and the component value of the second pixel; and a third pixel pattern value that is an absolute value of the difference between the component value of the third pixel and a component value of the fourth pixel.

20. The system of claim 19, wherein the first pixel pattern value is greater than or equal to a fifth threshold value, the second pixel pattern value is greater than or equal to a sixth threshold value, and the third pixel pattern value is greater than or equal to the sixth threshold value.

21. The system of claim 12, wherein the controller is configured to adjust the boundary verification value based at least in part on a second boundary verification value of a block of a second frame of the video signal.

22. The system of claim 12, wherein the frame of the video signal includes a plurality of rows and a plurality of columns, each row and each column including at least one pixel, wherein the block boundary detector is further configured to identify:
   a component value of each pixel of four consecutive pixels of one of the plurality of rows and the plurality of columns, wherein the first and second pixels are included in the first block, wherein the third and fourth pixels are included in the second block, and wherein the second and third pixels form part of the potential block boundary;
   a first pixel pattern value that is an absolute value of a difference between the component value of the second pixel and the component value of the third pixel;
   a second pixel pattern value that is an absolute value of a difference between the component value of the first pixel and the component value of the second pixel; and
   a third pixel pattern value that is an absolute value of a difference between the component value of the fourth pixel and the component value of the third pixel;
   wherein the filter is configured to maintain at least one of the component values of at least one of the four consecutive pixels in unfiltered form in response to determining that at least one of the first pixel pattern value is greater than or equal to a first filtering threshold value, the second pixel pattern value is greater than or equal to a second filtering threshold value, and the third pixel pattern value is greater than or equal to the second filtering threshold value.

23. The system of claim 12, wherein the frame of the video signal includes a plurality of rows and a plurality of columns, each row and each column including at least one pixel, wherein the block boundary detector is further configured to identify:
   a component value of each pixel of four consecutive pixels of one of the plurality of rows and the plurality of columns, wherein the first and second pixels are in the first block, wherein the third and fourth pixels are in the second block, and wherein the second and third pixels form part of the potential block boundary;
   a first pixel pattern value that is an absolute value of a difference between the component value of the second pixel and the component value of the third pixel;
   a second pixel pattern value that is an absolute value of a difference between the component value of the first pixel and the component value of the second pixel; and
   a third pixel pattern value that is an absolute value of a difference between the component value of the fourth pixel and the component value of the third pixel;
   wherein the filter is configured to adjust at least one of the component values of at least one of the four consecutive pixels.

24. The system of claim 23, wherein the filter is configured to adjust at least one of the component values of at least one of the four consecutive pixels in response to determining that the first pixel pattern value is less than a first filtering threshold value, the second pixel pattern value is less than a second filtering threshold value, and the third pixel pattern value is less than the second filtering threshold value.

25. The system of claim 23, wherein:
   the filter is further configured to identify one of the component values of the four consecutive pixels as being within a range of one of the first filtering threshold value and the second filtering threshold value; and
   the filter is further configured to adjust the one component value within the range of one of the first and second filtering threshold values based on the boundary verification value.

26. A non-transitory computer readable medium having stored thereon sequences of instructions including instructions that will cause a processor to:
   detect at least one potential block boundary of a frame of the video signal, wherein the frame includes a plurality of pixels;
   determine an offset parameter corresponding to a maximum number of pixels identified as forming the at least one potential block boundary;
   determine, based on the offset parameter, a boundary verification value, the boundary verification value being a function of the offset parameter and an average offset parameter; and
   determine, based on the boundary verification value, if the at least one potential block boundary includes at least one block boundary artifact.

27. The method of claim 1, wherein computing the adjusted component value includes computing a weighted average of the component value of the pixel and the filtered component value of the pixel using a weight function based on the boundary verification value.

28. The method of claim 1, wherein the act of determining the offset parameter includes determining the offset parameter corresponding to a maximum number of pixels that form at least one potential block boundary and wherein the act of determining, based on the offset parameter, the boundary verification value includes generating a ratio between the offset parameter and an average offset parameter.

29. The method of claim 26, wherein the average offset parameter is an average value of a plurality of offsets that exclude the offset parameter.

* * * * *